US012656708B2

(12) United States Patent
Okugawa et al.

(10) Patent No.: US 12,656,708 B2
(45) Date of Patent: Jun. 16, 2026

(54) IMAGE FORMING APPARATUS

(71) Applicant: CANON KABUSHIKI KAISHA, Tokyo (JP)

(72) Inventors: Hirokazu Okugawa, Shizuoka (JP); Shunsuke Matsushita, Kanagawa (JP); Hirokazu Fujino, Shizuoka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/541,079

(22) Filed: Dec. 15, 2023

(65) Prior Publication Data

US 2024/0210852 A1 Jun. 27, 2024

(30) Foreign Application Priority Data

Dec. 23, 2022 (JP) ................................ 2022-207683

(51) Int. Cl.
*G03G 15/08* (2006.01)

(52) U.S. Cl.
CPC ................................ *G03G 15/0856* (2013.01)

(58) Field of Classification Search
CPC ........... G03G 15/0844; G03G 15/5041; G03G 2215/00042
See application file for complete search history.

(56) References Cited

U.S. PATENT DOCUMENTS 8,565,625 B2 10/2013 Nishimura
2011/0170889 A1* 7/2011 Kawai ................ G03G 15/0856 399/58
2012/0002981 A1* 1/2012 Park ................... H04N 1/00344 399/8
2012/0099877 A1* 4/2012 Funatsu ............... G03G 15/553 399/81

(Continued)

FOREIGN PATENT DOCUMENTS

JP 2007-249069 A 9/2007
JP 2010-002771 A 1/2010

(Continued)

OTHER PUBLICATIONS

Hirokazu Fujino et al., U.S. Appl. No. 18/541,149, filed Dec. 15, 2023.

*Primary Examiner* — Jessica L Eley
(74) *Attorney, Agent, or Firm* — VENABLE LLP

(57) ABSTRACT

An image forming apparatus acquires print ratio information on an average print ratio of a developer image, and a controller notifies of an exchange of a supply container when developer in the supply container is decreased in amount by being supplied from a supply container to an accommodating portion and then a developer amount of the developer in the supply container indicated by the first developer amount information reaches a predetermined developer amount, executes the operation in an operation mode until the supply container connected to a developing unit is exchanged after the first notification, and notifies of (Continued)

an end of the operation in the operation mode when a use amount of the developer indicated by the second developer amount information reaches a predetermined usable amount. A developing setting portion sets the start developer amount depending on the exchange number information and the print ratio information.

12 Claims, 13 Drawing Sheets

(56) References Cited

U.S. PATENT DOCUMENTS

| | | | | |
|---|---|---|---|---|
| 2019/0101844 | A1* | 4/2019 | Mochizuki | G03G 15/0881 |
| 2019/0155189 | A1* | 5/2019 | Hinoue | G03G 15/0889 |
| 2024/0210853 | A1* | 6/2024 | Fujino | G03G 15/5016 |

FOREIGN PATENT DOCUMENTS

| | | | |
|---|---|---|---|
| JP | 4743273 | B2 | 8/2011 |
| JP | 2016-114735 | A | 6/2016 |
| JP | 2021-107869 | A | 7/2021 |

* cited by examiner

IMAGE FORMING APPARATUS

FIELD OF THE INVENTION AND RELATED ART

The present invention relates to an image forming apparatus such as a copying machine, a printer or a facsimile machine, using an electrophotographic type or an electrostatic recording type.

The image forming apparatus for forming an image on a recording material by using the electrophotographic type (electrophotographic process) forms an electrostatic latent image on an image bearing member in an image forming step (image forming operation), and then forms a toner image by supplying toner as a developer to the electrostatic latent image. A developing device for performing a developing step in the image forming operation is constituted in some cases so as to be detachably mountable to an apparatus main assembly of the image forming apparatus singly as an independent unit or as a part of a process cartridge.

The developing device includes, for example, a developing container (frame) for accommodating the toner and a developing roller as a developer carrying member which is provided rotatably at an opening of the developing container and which is as a developer carrying member for feeding the toner from an inside to an outside of the developing container by being rotated while carrying the toner. Further, the developing device includes, for example, a supplying roller as a supplying member for supplying the toner to the developing roller and a developing blade as a regulating member for regulating an amount of the toner which passes through the above-described opening while being carried on the developing roller.

When the image forming operation is repeated, the toner in the developing device is repetitively rubbed by the supplying roller and the developing blade. By this rubbing, deterioration of the toner occurs in some instances due to liberation, burying, and the like of an external additive added to the toner with respect to resin particles which are a base material of the toner. In addition, due to that a desired charge amount of the toner cannot be obtained (for example, a lowering in charge amount), the toner does not perform a desired function in some instances. By this, for example, an image defect such that the toner is deposited on a white background portion of the recording material, i.e., a so-called fog, can occur. Japanese Patent No. 4743273 discloses a constitution in which a deterioration degree of the toner in the developing device is calculated and integrated and discrimination that the developing device reaches an end of a lifetime is made on the basis of an integrated value thereof.

Further, in order to meet lifetime extension of the developing device and the process cartridge, in some cases, a supplying type in which the toner is supplied from a toner supply container such as a toner cartridge or a toner bottle to the developing device is employed. In this supplying type, correspondingly to consumption of the toner from the developing device, fresh toner which is not deteriorated in successively or periodically supplied from the toner supply container to the developing device. For that reason, toner deterioration is suppressed, so that the lifetime extension of the developing device and the process cartridge can be realized. Japanese Laid-Open Patent Application No. 2010-2771 discloses a constitution in which discrimination that the developing device reaches the end of the lifetime is made on the basis of a driving time of a developing device or a number of sheets printed.

In recent years, from a viewpoint of usability, it is required that the image forming apparatus is operated in an operation mode in which the image forming operation is capable of being continued even in a state in which the toner cannot be supplied to the developing device (hereinafter, this mode is referred to as a "printing continuation mode"). The state in which the toner cannot be supplied to the developing device is, for example, a state in which an amount of the toner in the toner supply container becomes small and thus the toner cannot be supplied from the toner supply container to the developing device sufficiently by an amount corresponding to a consumption thereof from the developing device. In the printing continuation mode, the toner cannot be sufficiently supplied from the toner supply container to the developing device, and the toner left in the developing device is used, so that printing is continued.

On the other hand, in recent years, in order to achieve a low CPP (cost per page), the lifetime of the developing device becomes long. For that reason, a plurality of toner supply containers are used for a single developing device.

However, in the case where the number of exchanges (exchange number) of the toner supply container for the single developing device increases, a proportion of rubbed and deteriorated toner in residual toner in the developing device becomes large. By this, when the number of rubbing of the residual toner in the developing device exceeds a certain value, there is a possibility of occurrences of an image defect such as fog, density non-uniformity of a half-tone image, dropping of the toner, and the like.

SUMMARY OF THE INVENTION

A principal object of the present invention is to provide an image forming apparatus capable of suppressing an occurrence of an image defect due to deteriorated toner until an end of an operation in an operation mode in which an image forming operation is capable of being continued in a state in which a developer cannot be sufficiently supplied from a supplying container to a developing device.

This object has been accomplished by an image forming apparatus according to the present invention.

According to an aspect of the present invention, there is provided an image forming apparatus comprising: an image bearing member configured to bear a developer image; a developing unit which includes a developing member for forming the developer image on the image bearing member by supplying a developer to the image bearing member and an accommodating portion for accommodating the developer supplied to the developing member and to which a supply container accommodating the developer supplied to the accommodating portion is detachably mountable; a first developer amount acquiring portion configured to acquire first developer amount information on a developer amount of the developer in the supply container connected to the developing unit; a second developer amount acquiring portion configured to acquire second developer amount information on a developer amount of the developer in the accommodating portion; and a first notifying portion configured to provide first notification on an exchange of the supply container in a case that the developer in the supply container is decreased in amount by being supplied from the supply container to the accommodating portion and then the developer amount of the developer in the supply container indicated by the first developer amount information reaches a predetermined developer amount; a storing portion configured to store exchange number information on a number of times of the exchange of the supply container for the developing unit; a setting portion configured to set a start developer amount which is a developer amount of the developer in the accommodating portion at a time of a start of an operation in an operation mode in which a developer image is capable of being formed by the developing unit; a second notifying portion configured to provide second notification notifying an end of the operation in the operation mode in a case that after the operation in the operation mode is started, a use amount of the developer from the developing unit indicated by the second developer information reaches a predetermined usable amount; and a controller, wherein the controller carries out control so as to be capable of executing the operation in the operation mode until the supply container connected to the developing unit is exchanged after the first notification is provided by the first notifying portion, and wherein the setting portion sets the start developer amount depending on the exchange number information.

Figure 3:
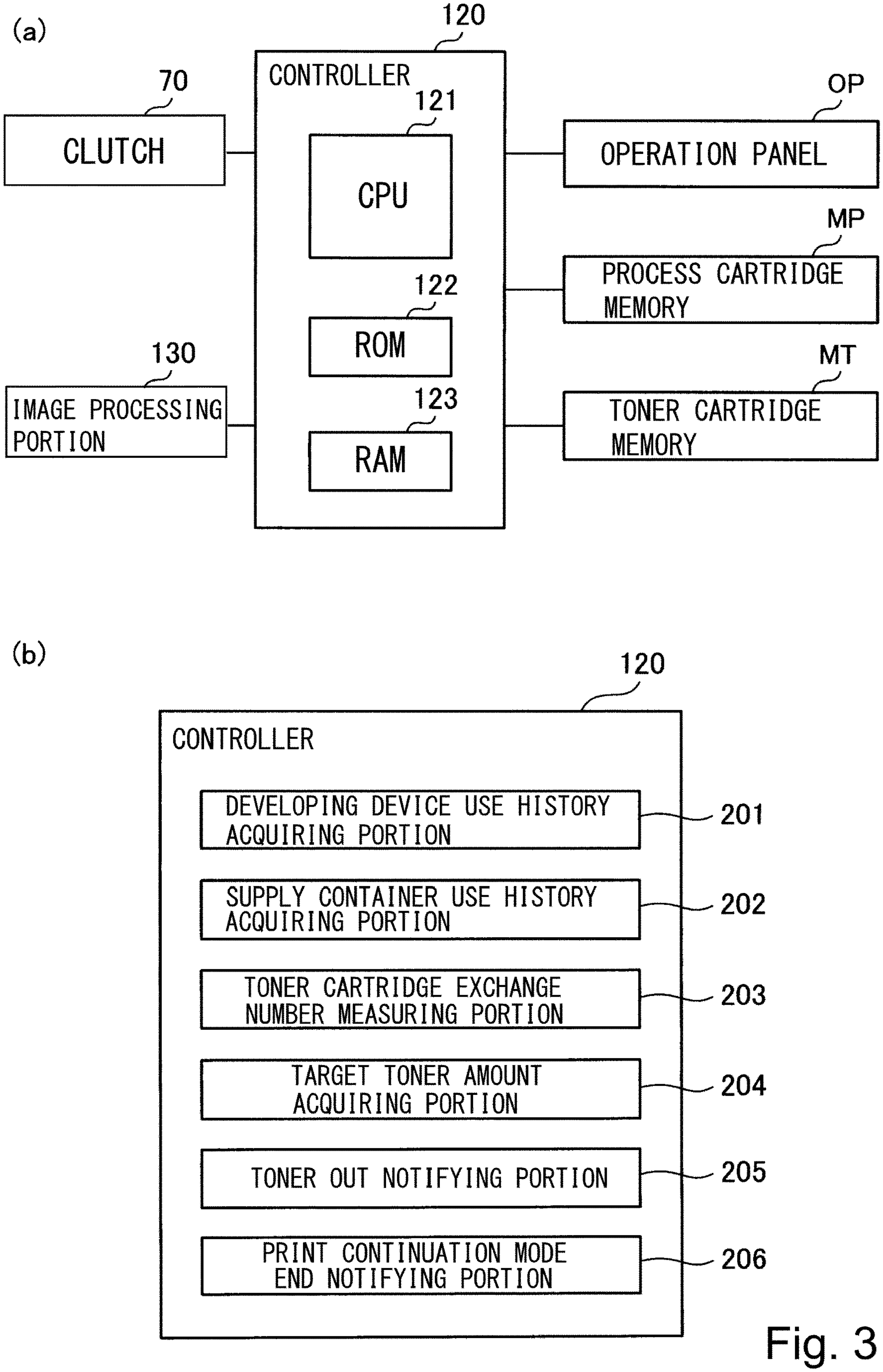

Parts (a) and (b) of FIG. 3 are schematic block diagrams each showing a control constitution of the image forming apparatus.

Figure 4:
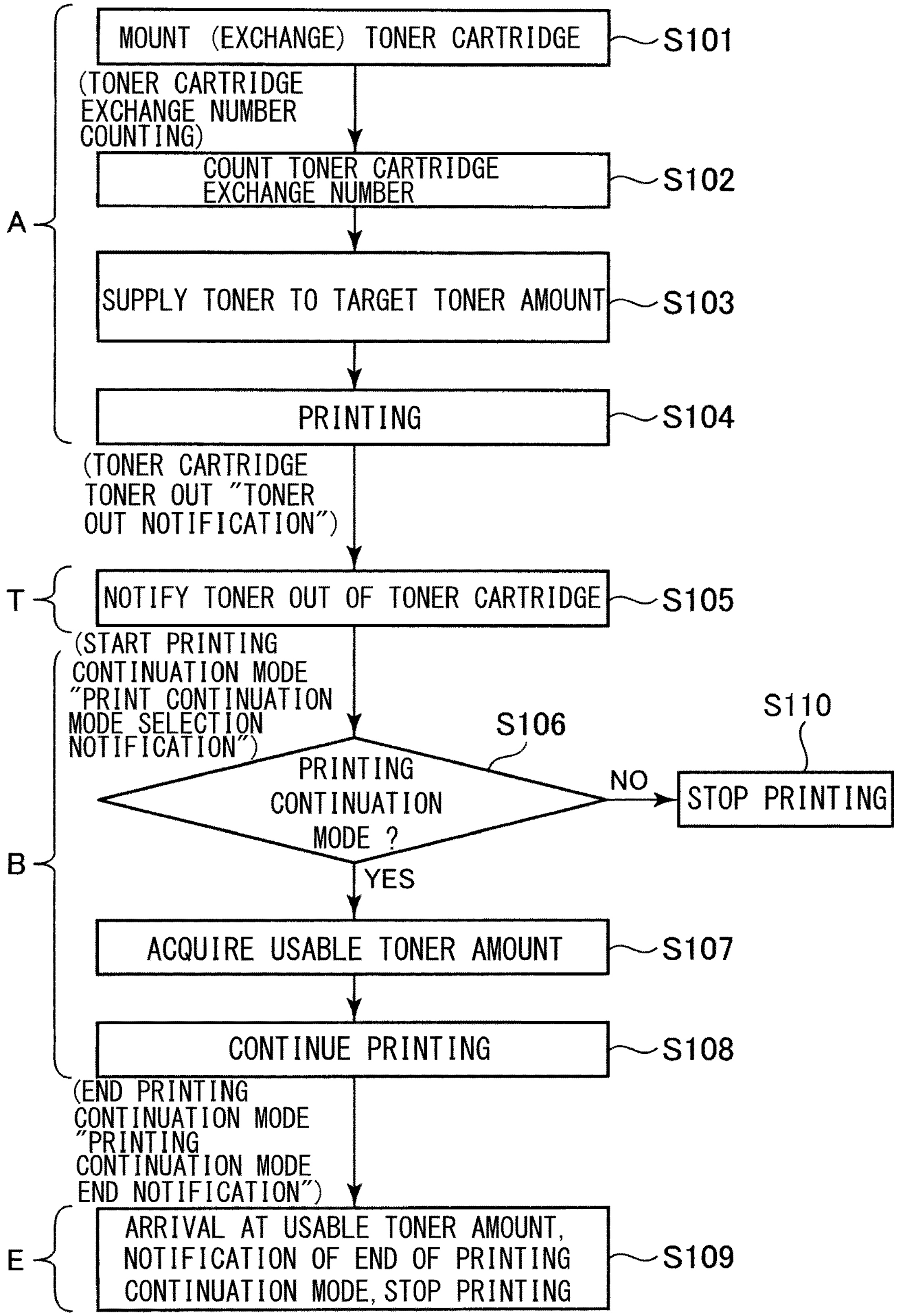

FIG. 4 is a flowchart for illustrating a control sequence of an operation of the image forming apparatus.

Figure 5:
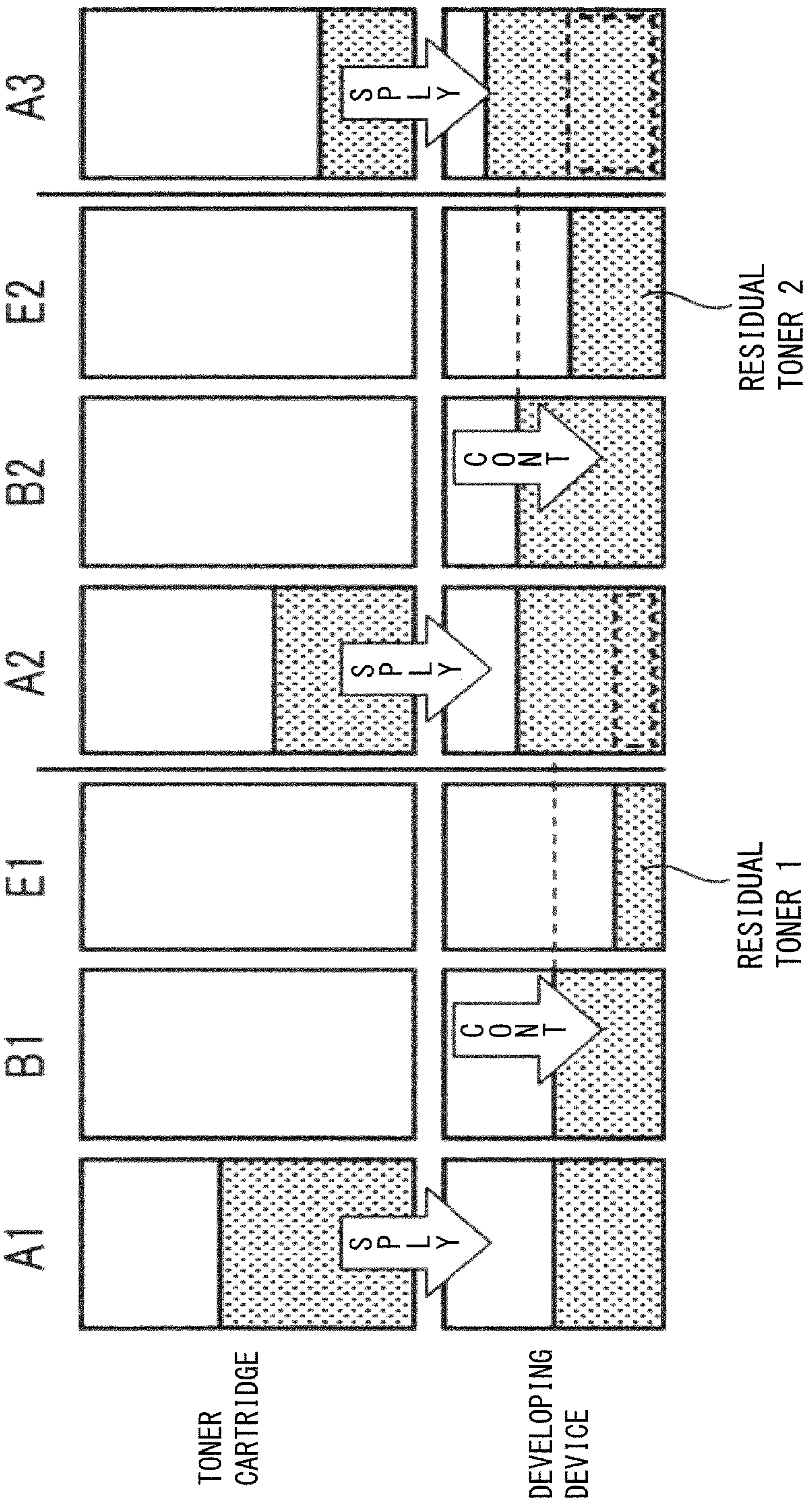

FIG. 5 is a schematic view for illustrating an amount and a state of toner in a developing device.

Figure 6:
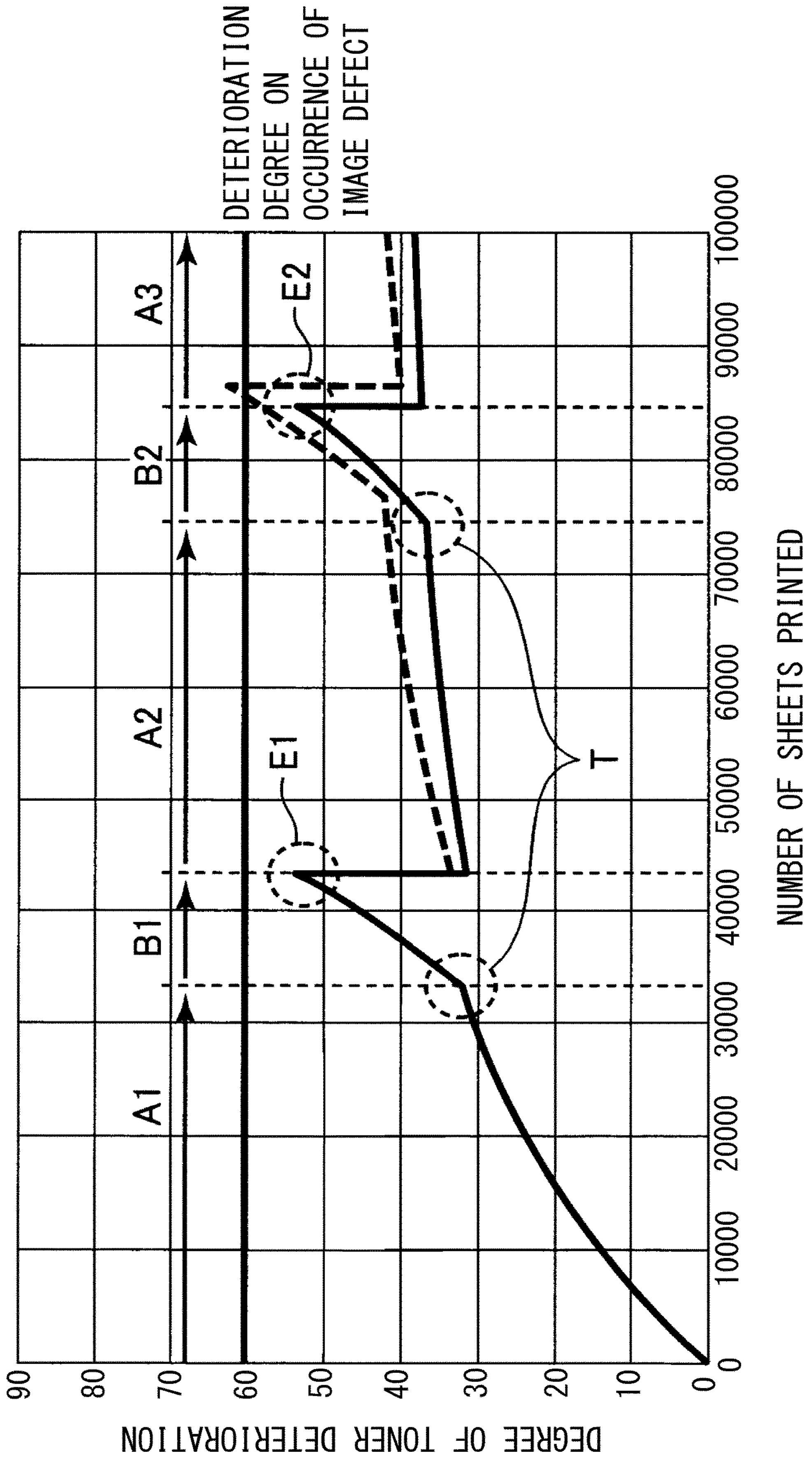

FIG. 6 is a graph for illustrating a relationship between a number of sheets printed and a toner deterioration degree.

Figure 7:
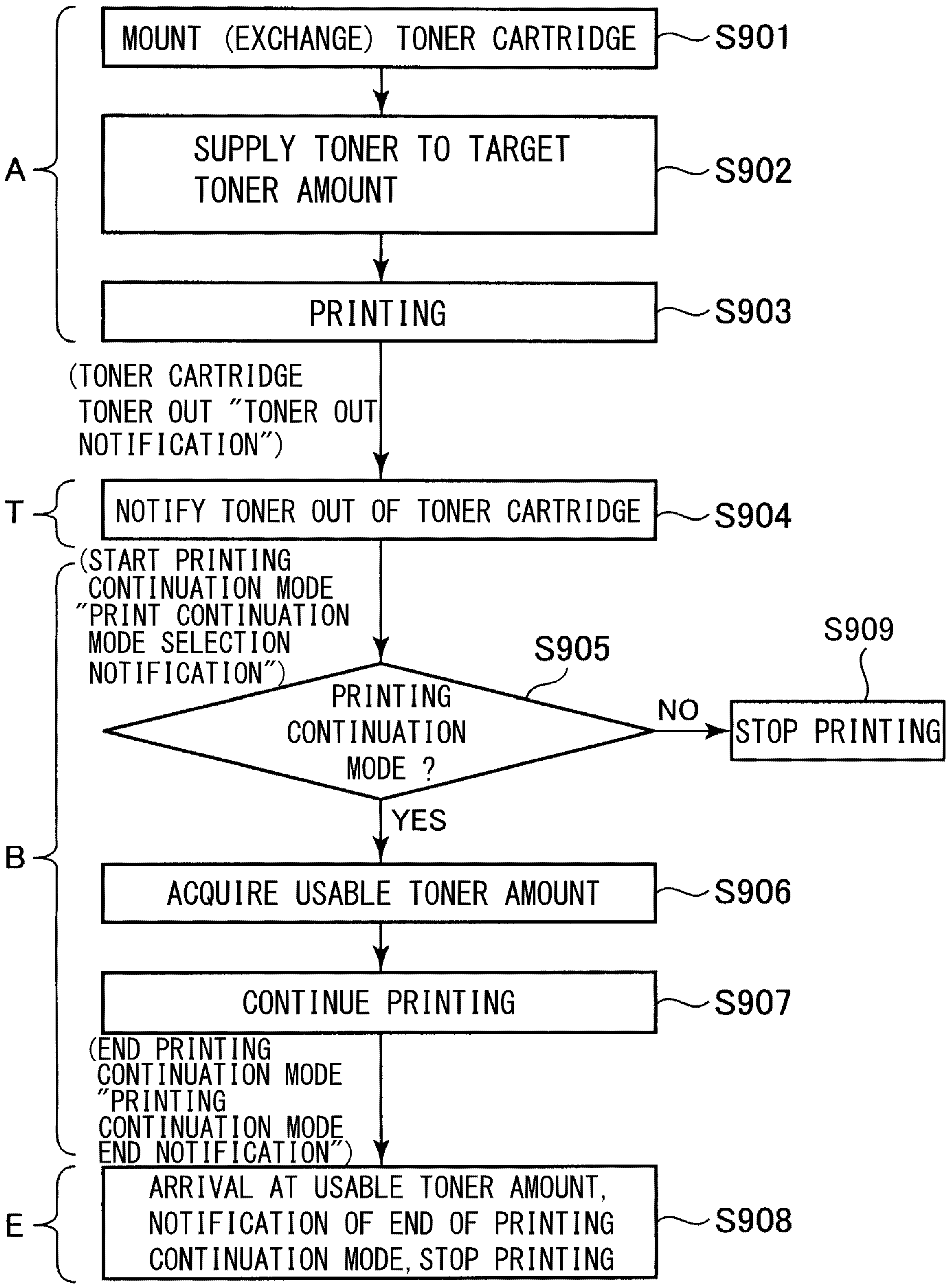

FIG. 7 is a flowchart for illustrating a sequence notifying an end of an operation in a printing continuation mode in a comparison example.

Figure 8:
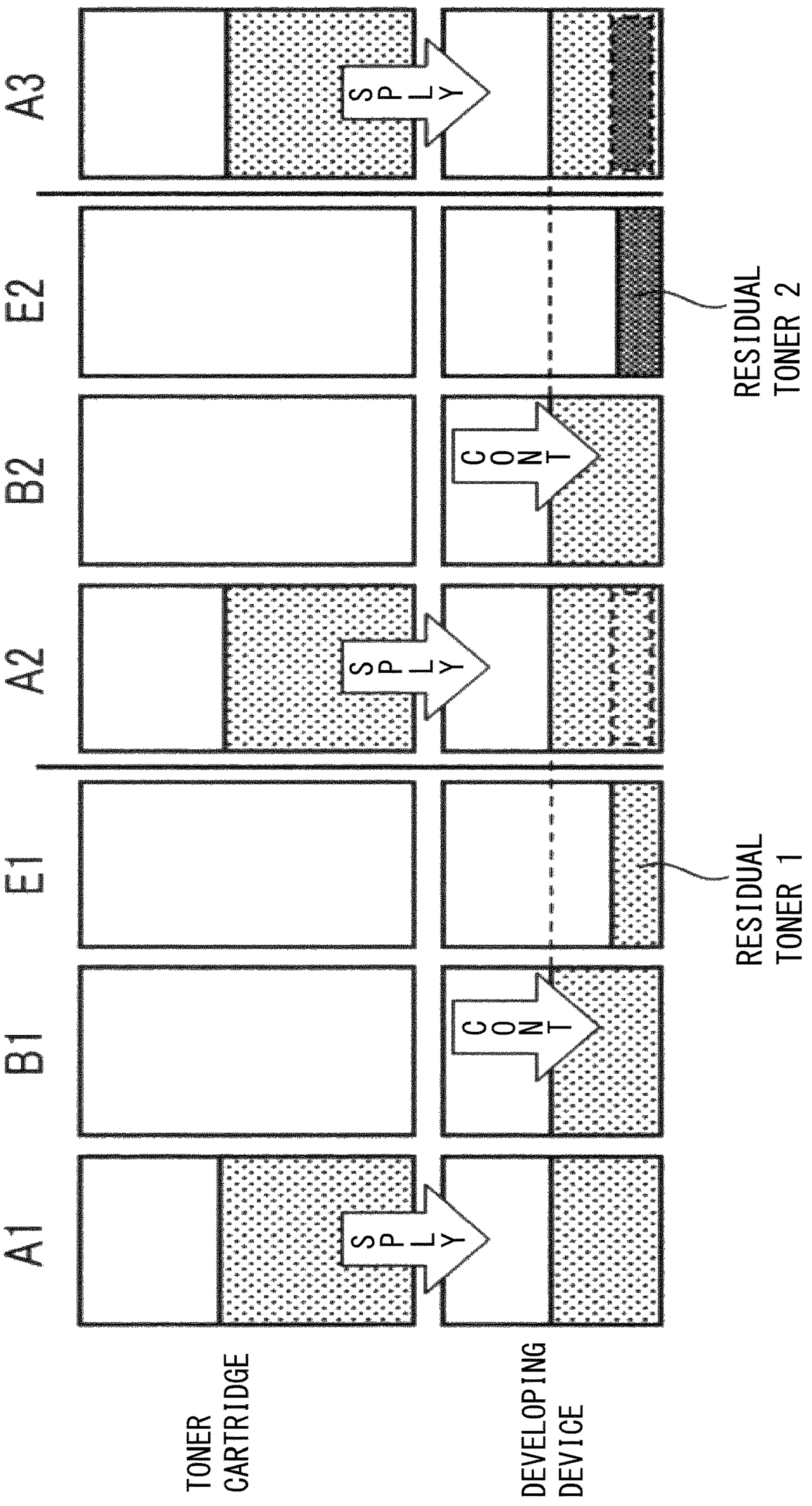

FIG. 8 is a schematic view for illustrating an amount and a state of toner in a developing device in the comparison example.

Figure 9:
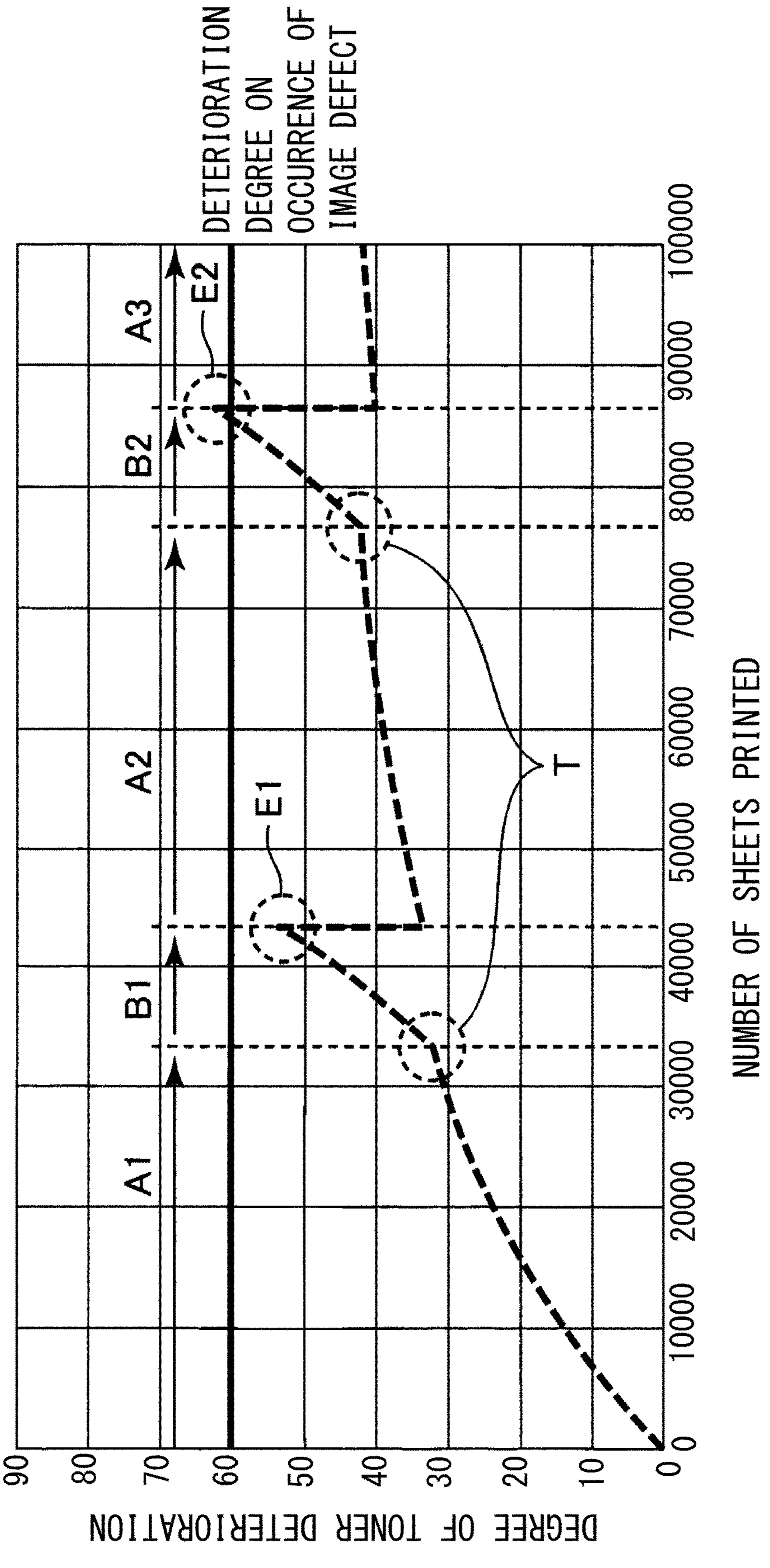

FIG. 9 is a graph for illustrating a relationship between a number of sheets printed and a toner deterioration degree in the comparison example.

Figure 10:
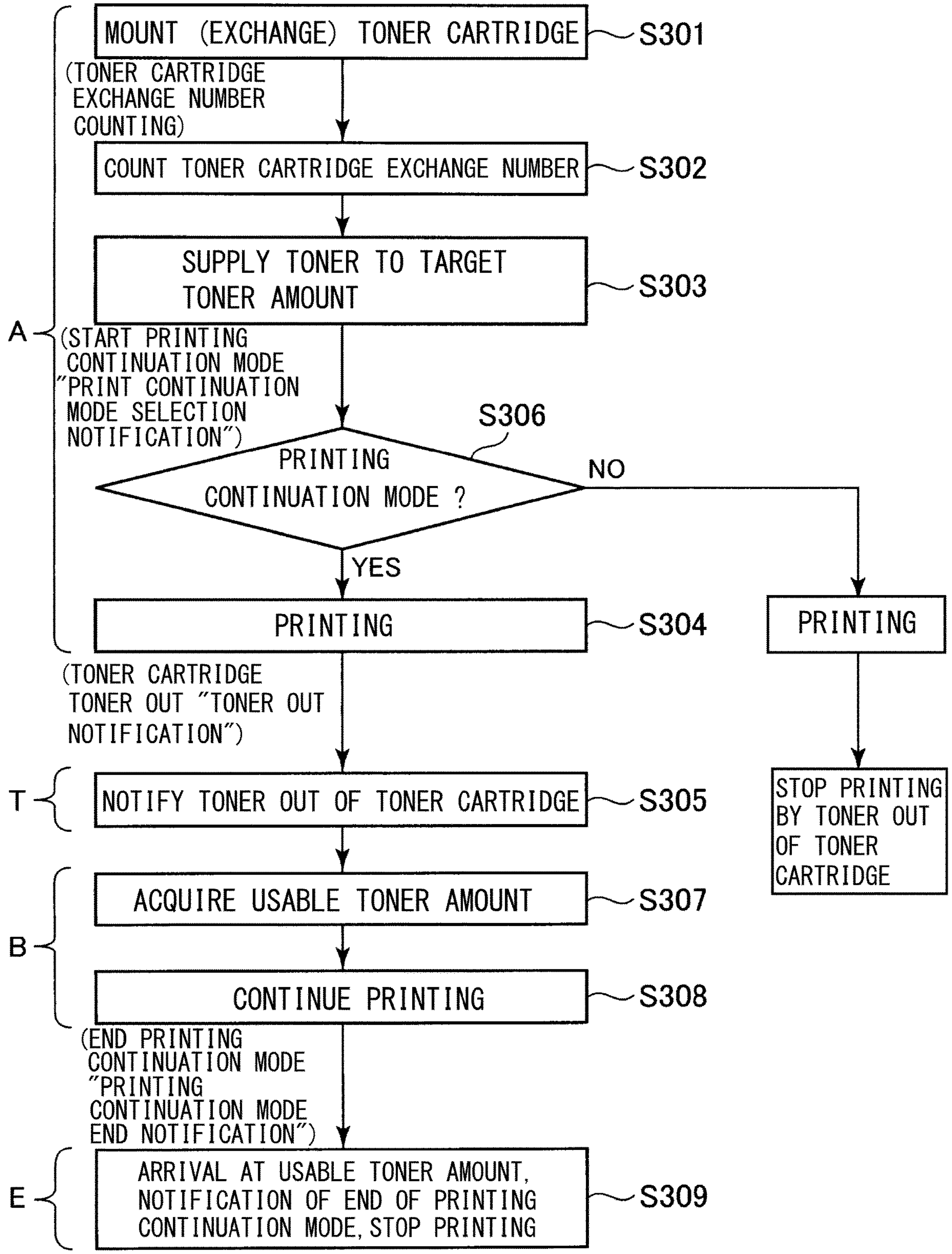

FIG. 10 is a flowchart for illustrating another example of the control sequence of the operation of the image forming apparatus.

Figure 11:
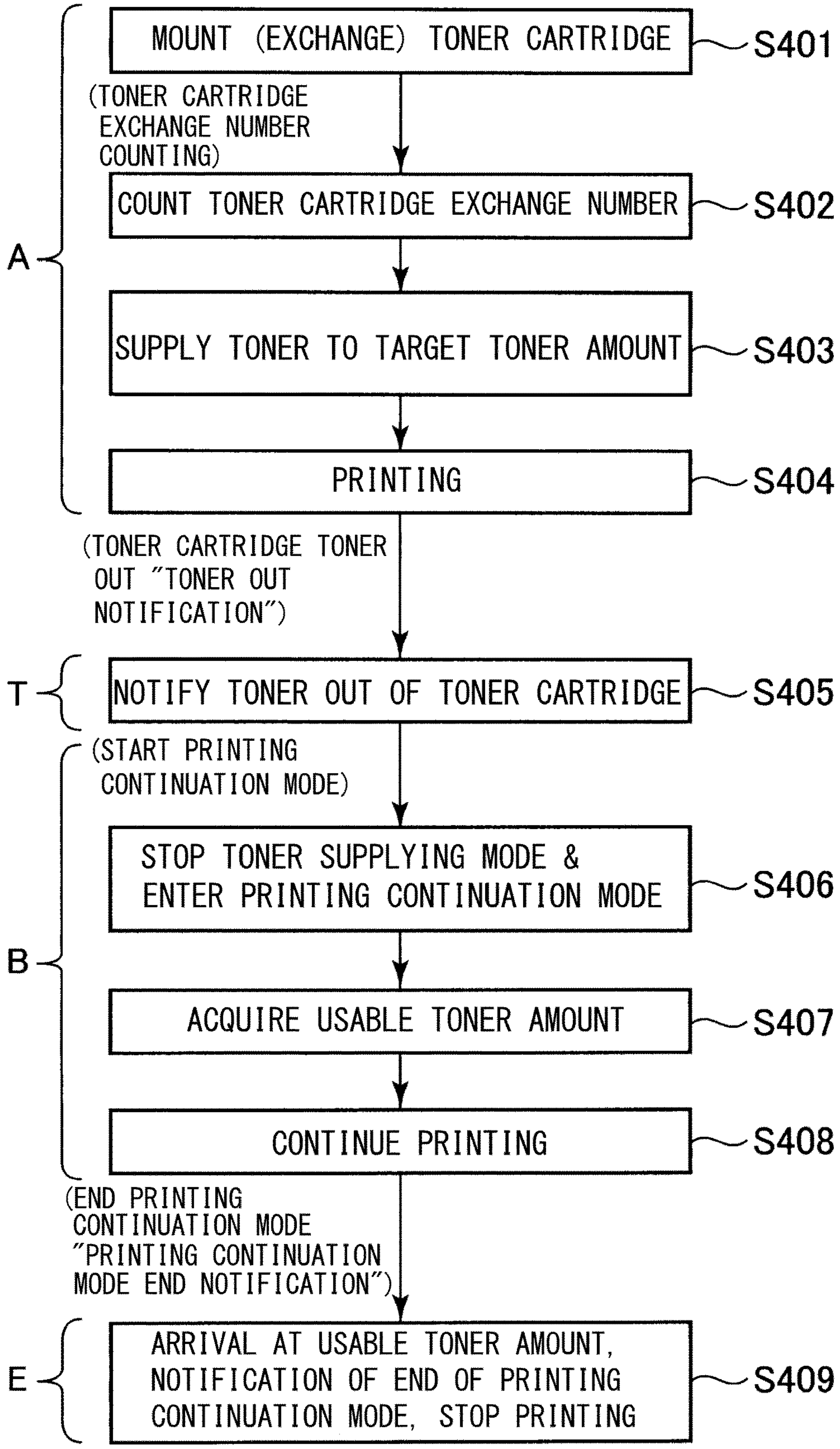

FIG. 11 is a flowchart for illustrating a further example of the control sequence of the operation of the image forming apparatus.

Figure 12:
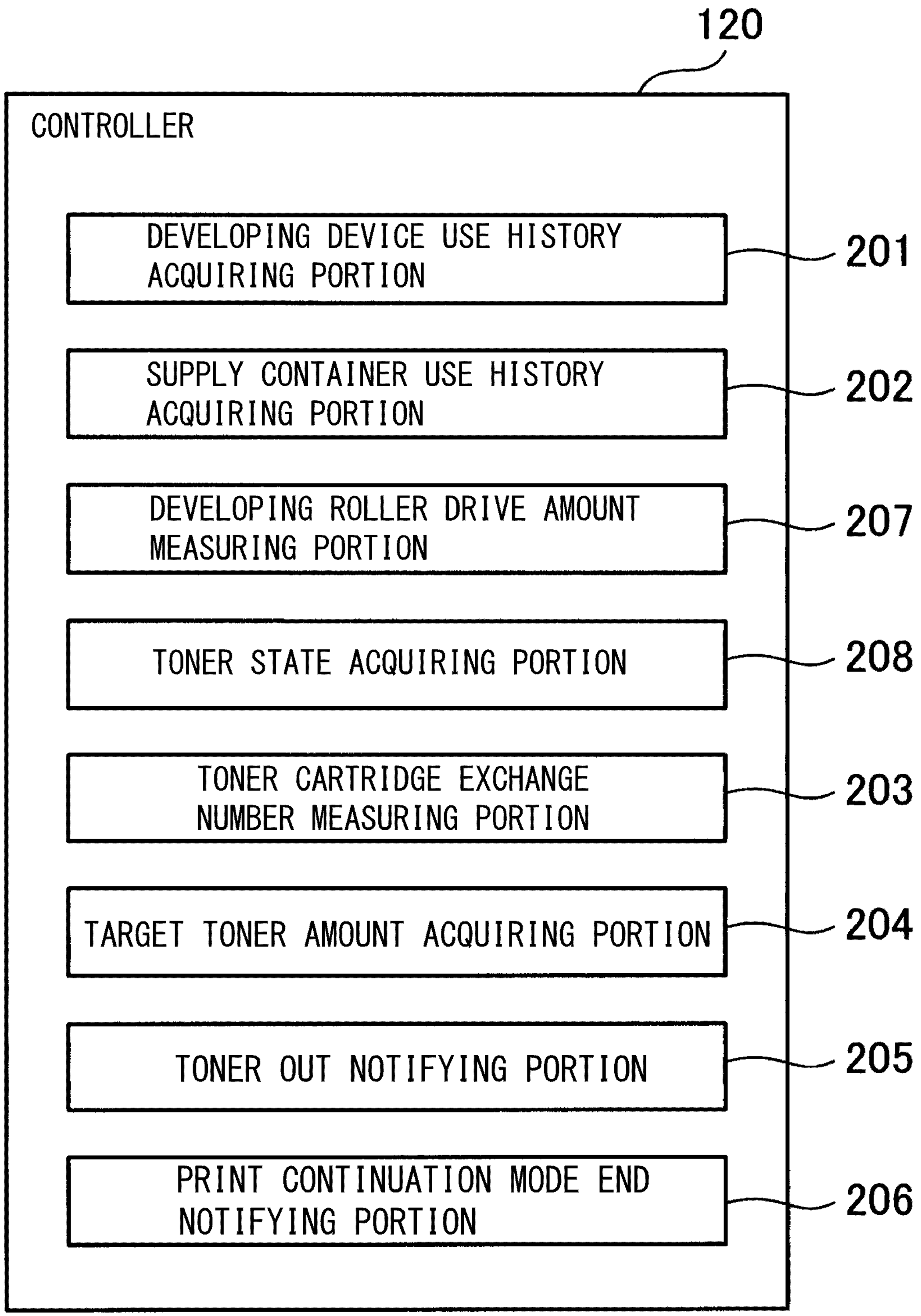

FIG. 12 is a schematic block diagram showing another example of the control constitution of the image forming apparatus.

Figure 13:
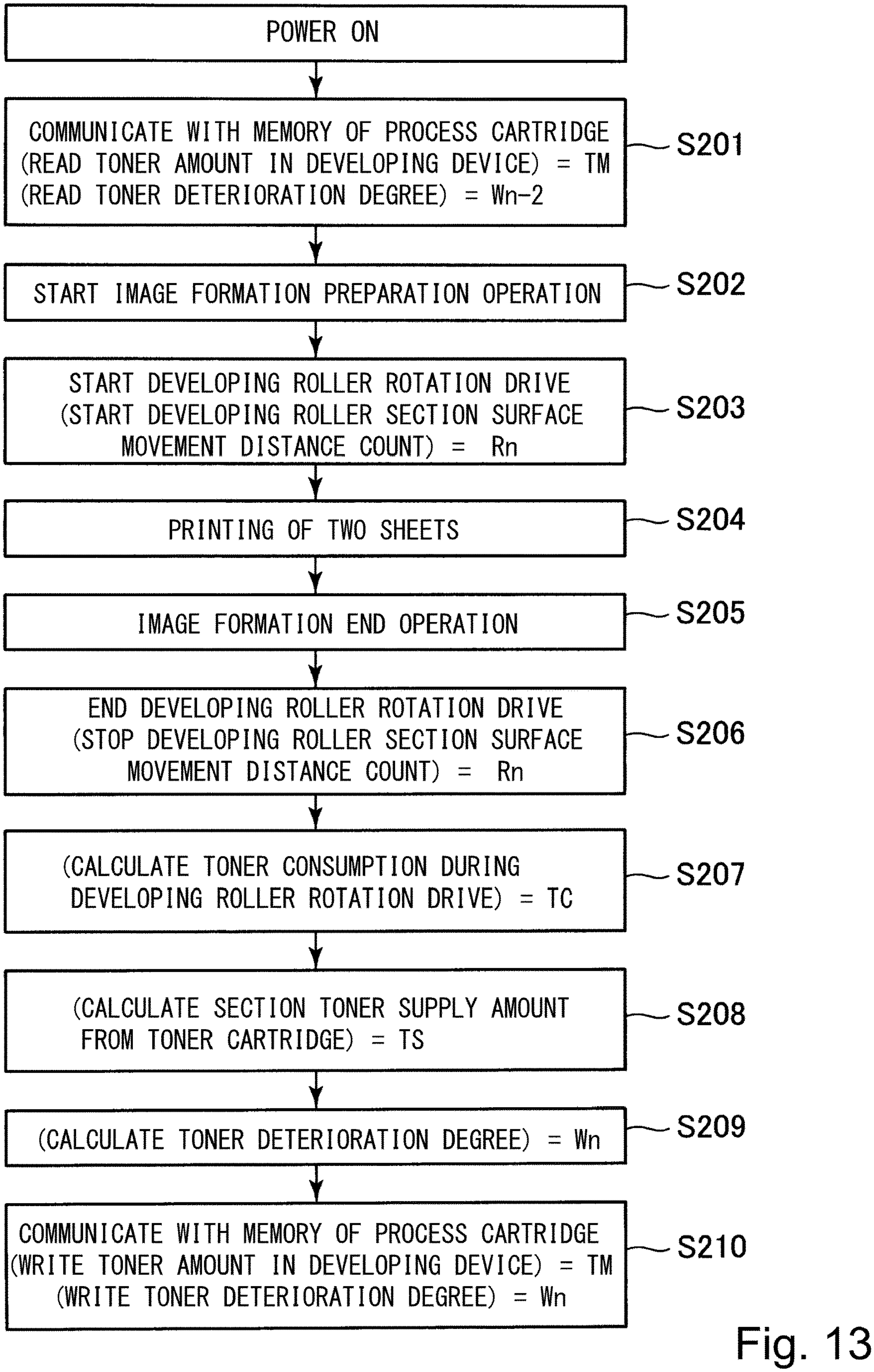

FIG. 13 is a flowchart for illustrating a sequence for calculating a toner deterioration degree.

DESCRIPTION OF THE EMBODIMENTS

<General Structure End Operation of Image Forming Apparatus>

Figure 1:
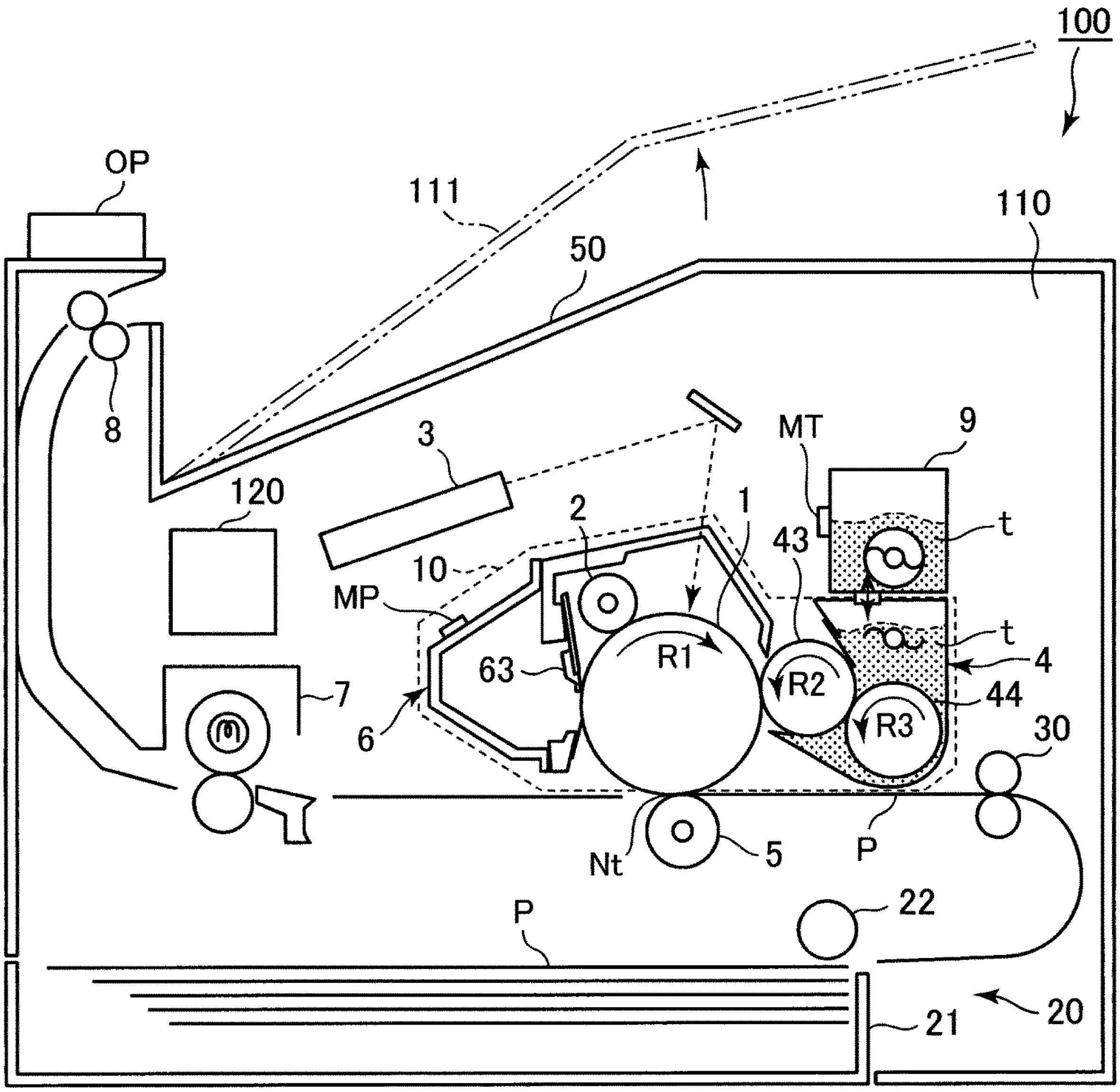
FIG. 1 is a schematic sectional view of an image forming apparatus.

FIG. 1 is a schematic sectional view of an image forming apparatus 100 of an embodiment. The image forming apparatus 100 of this embodiment is a monochromatic laser printer capable of forming a black (monochromatic) image on a sheet-like recording material P with use of an electrophotographic type.

In this embodiment, to the image forming apparatus 100, a process cartridge 10 is mounted so as to be detachably mountable to an apparatus main assembly 110. The process cartridge 10 is easily detachably mountable to the apparatus main assembly 110 via a mounting means (not shown), such as a mounting guide or a positioning member, provided in the apparatus main assembly 110 and on the process cartridge 10. Further, in this embodiment, to the image forming apparatus 100, a toner cartridge 9 as a toner supply container (developer supply container) is mounted so as to be detachably mountable to the apparatus main assembly 110 and the process cartridge 10. The toner cartridge 9 is easily detachably mountable in the apparatus main assembly 110 and on the process cartridge 10 via the mounting guide (not shown), such as the mounting guide or the positioning member, provided in the apparatus main assembly 110 and on the process cartridge 10. Incidentally, the apparatus main assembly 110 is a constitution portion excluding the process cartridge 10 and the toner cartridge 9 in the image forming apparatus 100. Each of the toner cartridge 9 and the process cartridge 10 is detachably mounted to the apparatus main assembly 110 by opening a top cover 111 provided openably and closably at an upper portion of the apparatus main assembly 110.

The process cartridge 10 includes a photosensitive drum 1 which is a rotatable drum-type (cylindrical) photosensitive member (electrophotographic photosensitive member) as an image bearing member for bearing a toner image, and includes a charging roller 2 which is a roller-type charging member as a charging means. In addition, the process cartridge 10 includes a developing device (developing unit) 4 as a developing means, and a cleaning device 6 as a cleaning means. Above the process cartridge 10, an exposure device (scanner unit) 3 as an exposure means is provided.

During an image forming operation, the photosensitive drum 1 is rotationally driven in an arrow R1 direction (clockwise direction) in FIG. 1 at a predetermined process speed (peripheral speed). A surface of a rotating photosensitive drum 1 is electrically charged uniformly to a predetermined polarity (negative polarity in this embodiment) and a predetermined potential by the charging roller 2. During the charging, to the charging roller 2, a predetermined charging voltage (charging bias) is applied. The charged surface of the photosensitive drum 1 is selectively exposed to light (scanning exposure) depending on image information (image signal) by the exposure device 3, so that an electrostatic latent image (electrostatic image) depending on the image information is formed on the photosensitive drum 1. The electrostatic latent image formed on the photosensitive drum 1 is developed (visualized) by being supplied with toner as a developer by the developing device 4, so that a toner image (developer image) depending on the image information is formed on the photosensitive drum 1. During the development, to a developing roller 43 provided in the developing device 4, a predetermined developing voltage (developing bias) is applied. In this embodiment, the photosensitive drum 1 is exposed to light after being charged uniformly, so that the toner charged to the same polarity (negative polarity in this embodiment) as a charge polarity of the photosensitive drum 1 is deposited on the photosensitive drum 1 at an exposure portion (image portion) (reverse development type). In this embodiment, a normal charge polarity of the toner which is a principal charge polarity of the toner during development is the negative polarity. As described specifically later, in this embodiment, toner in an amount corresponding to a consumption amount is successively supplied from the toner cartridge 9 to the developing device 4.

Opposed to the photosensitive drum 1, a transfer roller 5 which is a roller-type transfer member as a transfer means is provided. The transfer roller 5 is pressed toward the photosensitive drum 1, and forms a transfer portion (transfer position) Nt which is a contact portion between the photosensitive drum 1 and the transfer roller 5. The toner image formed on the photosensitive drum 1 is transferred in the transfer portion Nt onto a recording material P nipped and conveyed by the photosensitive drum 1 and the transfer roller 5. During transfer, to the transfer roller 5, from a transfer power source (not shown) as a transfer voltage applying means provided in the apparatus main assembly 110, a predetermined transfer voltage (transfer bias) which is a DC voltage of a polarity (positive polarity in this embodiment) opposite to the normal charge polarity of the toner is applied. By this, an image is formed on the recording material P. The recording material (transfer material, recording medium, sheet) P is supplied from a feeding portion 20 to the transfer portion Nt. The feeding portion 20 is constituted by a cassette 21 as a recording material accommodating portion, a feeding roller 23 as a feeding member, and the like. The recording material P accommodated in the cassette 21 is separated and fed one by one from the cassette 21 by the feeding roller 22 or the like. This recording material P is conveyed toward the transfer portion Nt by being timed to the toner image on the photosensitive drum 1 by a registration roller 30 as a conveying member.

The recording material P on which the toner image is transferred is conveyed to a fixing device 7 as a fixing means. The fixing device 7 fixes (melts, sticks) the toner image on the recording material P by heating and pressing the recording material P carrying thereon the unfixed toner image. The recording material P on which the toner image is fixed is discharged (outputted) onto a tray 50 as a discharge portion, provided at an upper portion of the apparatus main assembly 110, by a discharging roller 8 or the like as a conveying member.

On the other hand, toner remaining on the photosensitive drum 1 without being transferred onto the recording material P during the transfer (transfer residual toner) is removed and collected from the photosensitive drum 1 by the cleaning device 6.

<Process Comparison Example>

Figure 2:
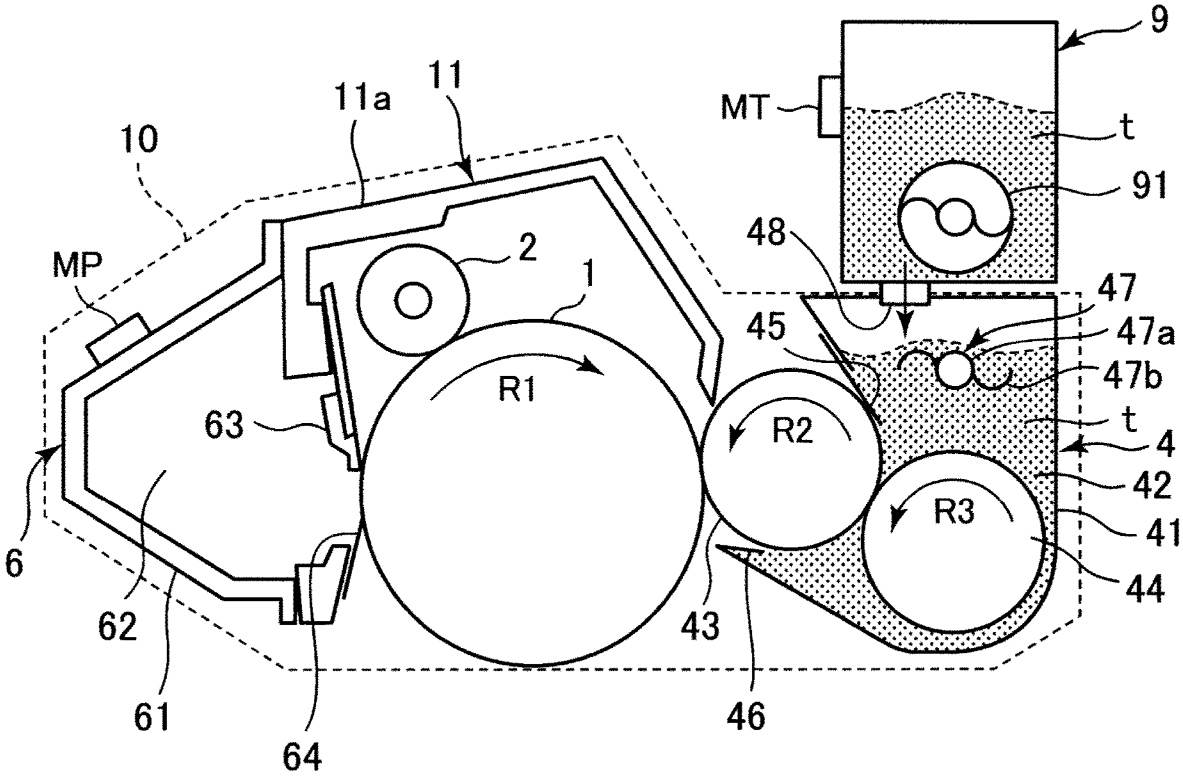
FIG. 2 is a schematic sectional view of a process cartridge and a toner cartridge.

Next, the process cartridge 10 in this embodiment will be further described. FIG. 2 is a schematic sectional view of the process cartridge in this embodiment. Incidentally, in FIG. 2, the toner cartridge 9 is also shown.

The process cartridge 10 includes a drum unit 11 and the developing device (developing unit) 4. The drum unit 11 and the developing unit 4 are connected to each other, and constitute the process cartridge 10 integrally detachably mountable to the apparatus main assembly 110.

The drum unit 11 includes the photosensitive drum 1, the charging roller 2, and the cleaning device 6. The photosensitive drum 1 is rotatably mounted to a drum unit frame 11*a*.

To the surface (outer peripheral surface) of the photosensitive drum 1, the charging roller 2 and a cleaning member 63 of the cleaning device 6 are contacted. To the photosensitive drum 1, a driving force is transmitted from a driving motor (not shown) as a driving source constituting a driving means provided in the apparatus main assembly 110, so that the photosensitive drum 1 is rotationally driven in an arrow R1 direction (clockwise direction) in FIG. 2 at a predetermined process speed (peripheral speed).

The cleaning device 6 includes a cleaning container (cleaning frame) 61 constituting a part of the drum unit frame 11*a*. Inside the cleaning container 61, a removed toner chamber 62 for accommodating transfer residual toner removed from the photosensitive drum 1 is formed. To the cleaning container 61, the cleaning member 63 is mounted. The cleaning member 63 is constituted by including a rubber blade which is a plate-like member formed of a rubber as an elastic member, and a cleaning (blade) supporting member for supporting the cleaning blade. The cleaning member 63 is disposed in contact with the photosensitive drum 1 so that a free end portion of the rubber blade is directed in a counter direction to a rotational direction of the photosensitive drum 1. The cleaning device 6 scrapes off the transfer residual toner from the surface of the rotating photosensitive drum 1 by the cleaning member 63, and collects the transfer residual toner by dropping the transfer residual toner into the removed toner chamber 62. Further, to the cleaning container 61, a scooping sheet 64 for preventing leakage of the toner from the removed toner chamber 62 is mounted. The scooping sheet 64 is disposed in contact with the surface of the photosensitive drum 1 on a side upstream of the cleaning member 63 with respect to the rotational direction of the photosensitive drum 1.

The charging roller 2 is rotatably mounted to the drum unit frame 11*a*. The charging roller 2 is disposed in contact with the surface of the photosensitive drum 1 and is pressed toward the photosensitive drum 1 by a pressing member (not shown), so that the charging roller 2 is rotated with rotation of the photosensitive drum 1. Further, to the charging roller 2, a predetermined charging voltage (charging bias) is applied from a charging power source (not shown) as a charging voltage applying means provided in the apparatus main assembly 110.

The developing device (developing unit) 4 includes the developing container (developing frame) 41. Inside the developing container 41 as an accommodating portion, a toner accommodating chamber 42 for accommodating toner t is formed. In this embodiment, in the toner accommodating chamber 42, a non-magnetic one-component developer (toner) as the developer is accommodated. To the developing container 41, the developing roller 43 as a developer carrying member (developing member) and a supplying roller 44 as a supplying member are rotatably mounted. The developing roller 43 carries out conveying the toner and thus supplies the toner to the photosensitive drum 1 depending on the electrostatic latent image on the photosensitive drum 1. The supplying roller 44 supplies the electrostatic latent image on the photosensitive drum 1. Further, to the developing container 41, a developing blade 45 as a regulating member is mounted. The developing blade 45 not only regulates a toner amount of a toner layer on the developing roller 43 but also triboelectrically charges the toner. Further, to the developing container 41, a blowing-out preventing sheet 46 is mounted. In addition, to the developing container 41, a stirring member 47 is rotatably mounted.

The developing roller 43 is disposed in contact with the photosensitive drum 1, and to which a driving force is transmitted from a driving motor (not shown) as a driving source constituting a driving means provided in the apparatus main assembly 110, so that the developing roller 43 is rotationally driven in an arrow R2 direction (counterclockwise) direction in FIG. 2. Further, the supplying roller 44 is disposed in contact with the developing roller 43, and to which a driving force is transmitted from a driving motor (not shown) as a driving source connecting a driving means provided in the apparatus main assembly 110, so that the supplying roller 44 is rotationally driven in an arrow R3 direction (counterclockwise) direction in FIG. 2. Further, to the developing roller 43, a predetermined developing voltage (developing bias) is applied from a developing power source (not shown) as a developing voltage applying means provided in the apparatus main assembly 110. When the toner supplied to the developing roller 43 by the supplying roller 44 passes through a contact portion between the developing blade 45 and the developing roller 43, not only an amount of the toner on the developing roller 43 (toner coat amount) is regulated, but also the toner is triboelectrically charged. By this, a toner coat suitable for developing the electrostatic latent image formed on the photosensitive drum 1 is formed on the developing roller 43. Each of the developing roller 43 and the photosensitive drum 1 is rotated, so that in a developing portion which is an opposing portion (contact portion) between the developing roller 43 and the photosensitive drum 1, surfaces of these rollers move in the same direction (direction from above toward below in this embodiment). In this embodiment, during the development, to the developing roller 43, a predetermined developing voltage which is a DC voltage (DC bias) of the same polarity (negative polarity in this embodiment) as the normal charge polarity of the toner is applied. Then, the toner on the developing roller 43 charged to the negative polarity by triboelectric charge is transferred onto a light-part potential portion on the photosensitive drum 1 by a potential difference between an image portion (light-part potential portion) of the electrostatic latent image on the photosensitive drum 1 and the developing voltage. By this, the electrostatic latent image on the photosensitive drum 1 is developed (visualized).

Further, the blowing-out preventing sheet 46 is disposed in contact with the developing roller 43, and prevents leakage of the toner from the developing container 41.

Further, the stirring member 47 is disposed in the toner accommodating chamber 42, and not only stirs the toner accommodated in the toner accommodating chamber 42 but also conveys the toner toward the supplying roller 44. The stirring member 47 is constituted by including a stirring shaft 47*a* rotatably mounted to the developing container 41 and a sheet member 47*b* which is mounted on the stirring shaft 47*a* and which is rotated together with the stirring shaft 47*a*. To the stirring shaft 47*a* of the stirring member 47, a driving force is transmitted from a driving motor (not shown) as a driving source constituting a driving means provided in the apparatus main assembly 110, so that the stirring shaft 47*a* is rotationally driven.

Incidentally, the driving sources of the photosensitive drum 1 and the respective rotatable members (the developing roller 43, the supplying roller 44, the stirring member 47) of the developing device 4 may be made common.

Further, in this embodiment, to the process cartridge 10, as shown in FIGS. 1 and 2, a process cartridge memory MP (hereinafter, simply also referred to as the "memory MP") which is a non-volatile storing means (storing medium) is a storing portion. In the process cartridge memory MP, use information (information on use history) and lifetime information (information on exchange time (timing)) of the developing device 4 (process cartridge 10) are stored. Further, in the process cartridge memory MP, use information (information on use history) and lifetime information (information on exchange time) of the toner cartridge 9 are stored. Further, in the process cartridge memory MP, information on the number of times of exchange of the toner cartridge 9 (toner cartridge exchange number) (i.e., information on an exchange number of the toner cartridge 9 for a single developing device 4) described later is stored. The process cartridge memory MP functions as a memory tag for grasping the information on the developing device 4 (process cartridge 10) and the toner cartridge 9 on the apparatus main assembly 110 side. By this, even in the case where ON/OFF of the power source of the apparatus main assembly 110 and mounting and dismounting of the process cartridge 10 are performed, on the basis of the above-described information stored in the memory MP, control according to the process cartridge 10 (developing device 4) can be appropriately carried out. That is, acquisition of a use status (use history) and the exchange time (lifetime) of the developing device 4 (process cartridge 10), on end time (timing) of an operation in a printing continuation mode described later, and the like can be made accurately and quickly. However, the present invention is not limited thereto, and the information stored in the process cartridge memory MP in this embodiment may also be stored in a memory provided in a controller 120 described later, for example.

In this embodiment, (1) a toner consumption amount of the developing device 4, (2) a toner supply amount from the toner cartridge 9 to the developing device 4, and (3) a toner amount in an initial developing device 4 become particularly important parameters for detecting a toner amount (remaining toner amount) in the developing device 4.

(1) In this embodiment, the toner consumption amount of the developing device 4 is calculated in the following manner. That is, in this embodiment, the toner consumption amount with image formation (development) is obtained by counting the number of pixels of image information and then by being calculated on the basis of a relationship acquired in advance between the number of pixels and the toner consumption amount (pixel count type, video count type). Further, the toner consumption amount by a toner consumption operation (fog during non image formation an adjusting operation, and the like) other than the image formation is calculated from a toner consumption amount acquired in advance for each toner consumption operation other than the image formation.

(2) In this embodiment, the toner supply amount from the toner cartridge 9 to the developing device 4 is calculated in the following manner. That is, in this embodiment, the toner supply amount from the toner cartridge 9 to the developing device 4 is calculated on the basis of a time of an operation for discharging the toner from the toner cartridge 9 (i.e., on the basis of a toner discharging operation, a toner supplying operation) (supply time measuring type). As described specifically later, in this embodiment, the toner cartridge 9 is provided with a toner discharging device 91 (FIG. 2). This toner discharging device 91 is operated through transmission of a driving force from a driving motor (not shown) as a driving source constituting a driving means provided in the apparatus main assembly 110 to the toner discharging device 91 via a clutch 70 (FIG. 3) as a drive-connecting portion provided in the apparatus main assembly 110. In this embodiment, a time in which this clutch 70 for drive connecting the toner cartridge 9 with the toner discharging device 91 is turned on (ON) (i.e., toner discharging operation time) is measured. Then, on the basis of a relationship acquired in advance between the toner discharging operation toner and a toner discharge amount, the toner supply amount is calculated.

(3) In this embodiment, the toner amount (remaining toner amount) in the developing device 4 is calculated in the following manner. That is, in this embodiment, on the basis of the toner amount of the toner charged in the developing device 4 in an initial stage (new article state, unused state), and the above-described (1) toner consumption amount of the developing device 4 and (2) toner supply amount from the toner cartridge 9 to the developing device 4, the toner amount in the developing device 4 is sequentially calculated. Specifically, by “toner amount in the initial developing device 4” “toner consumption amount of the developing device 4”+“toner supply amount from the toner cartridge 9 to the developing device 4”, the toner amount in the developing device 4 can be sequentially calculated. Further, on the basis of a detection result by another detecting means for detecting the toner amount in the developing device 4, correction is made, so that the toner amounts of the above described (1), (2), and (3) can be calculated more accurately. For example, by using a detecting means of a weight detection type for detecting a weight of the developing device 4, at an appropriate timing, the toner amounts of the above-described (1), (2), and (3) can be corrected. Similarly, an optical detection type, an electrostatic capacity type, a developer surface detection type, and the like can be used irrespective of the detection type. For example, during the image forming operation, the toner amount in the developing device 4 is detected on the basis of the toner amounts of the above-described (1), (2), and (3), and then, at the time of an end of the image forming operation, correction by the detection result of the above-described another detecting means can be made. Incidentally, the above-described detection types may be used in any combination or singly.

Incidentally, the weight detection type is a type in which the toner amount in the developing device 4 is detected on the basis of the weight of the developing container 41 in which the toner is accommodated. Further, the optical detection type is a type in which a light source for emitting light to an inside of the developing container 41 and a light receiving portion for receiving light passed through the developing container 41 are used and then the toner amount is detected on the basis of a change in light receiving state of the light receiving portion. Further, the electrostatic capacity type is a type in which an electrode changing in electrostatic capacity detected depending on a change in state of the toner in the developing container 41 is used (for example, an electroconductive member is applied to a container inner wall) and then the toner amount in the developing container 41 is detected on the basis of the change in detected electrostatic capacity. Further, the developer surface detection type is a type in which the toner amount in the developing container 41 is detected on the basis of a position (height) of a surface of the toner (developer) in the developing container 41.

Use history values (the toner consumption amount, the toner supply amount, the toner supply amount, the remaining toner amount) of the developing device 4 are stored in the process cartridge memory MP. In this embodiment, the use history values of the developing device 4 are increased by being counted in interrelation with toner consumption operation such as the image formation. That is, the use history values of the developing device 4 are increased with consumption of the toner from the developing device 4. Further, in this embodiment, as described specifically later, the image forming apparatus 100 executes processing of notifying an operator of an end of the operation in the printing continuation mode at a time when the toner consumption amount indicated by the use history value of the developing device 4 reaches a usable toner amount in the operation in the printing continuation mode. Further, at the same time, the image forming apparatus 100 stops printing (i.e., prohibits the execution of the image forming operation) until the toner cartridge 9 is exchanged (until the state returns from a state in which the toner cannot be supplied to the developing device 4 to a state in which the toner can be supplied to the developing device 4).

Incidentally, in this embodiment, information of a relationship between the number of pixels and the toner consumption amount, information of the toner supply amount of the toner by the toner consumption operation other than the image formation, and information of a relationship between a toner discharge operation time and the toner discharge amount are stored in the memory MP (or the ROM 122) in advance. Further, in this embodiment, information of the above-described usable amount is set in advance and is stored in the process cartridge memory MP.

<Toner Cartridge>

Next, the toner cartridge 9 in this embodiment will be described.

As shown in FIGS. 1 and 2, above the process cartridge 10, the toner cartridge 9 as the toner supply container (developer supply container) is disposed. The toner cartridge 9 is constituted so as to be detachably mountable to the apparatus main assembly 110 and the process cartridge 10. Inside the toner cartridge 9, a supply toner chamber 92 for accommodating toner t for supply is formed.

The toner cartridge 9 includes a toner discharging device (toner discharging mechanism) 91 as a toner discharging means for discharging the toner t from the toner cartridge 9 toward the developing container 41 (toner accommodating chamber 42) of the developing device 4 in the process cartridge 10. In this embodiment, the toner discharging device 91 discharges the toner t accommodated in the toner cartridge 9 downward, and supplies the toner into the developing container 41 (toner accommodating chamber 42) of the developing device 4 in the process cartridge 10.

In this embodiment, the toner discharging device 91 employs a volume-variable pump type. This toner discharging device 91 is operated by transmission thereto a driving force from a driving motor (not shown) as a driving source constituting a driving means provided in the apparatus main assembly 110 via the clutch 70 (FIG. 3) as the drive-connecting portion provided in the apparatus main assembly 110. That is, the toner discharging device 91 is drive-connected by the clutch 70 for a desired time at desired timing, so that a volume-variable pump is operated and the toner in a desired amount is discharged. The toner discharged from the toner cartridge 9 is conveyed to the inside of the developing container 41 via a communication opening (supply opening) 48 provided in the developing container 41, and is supplied into the toner accommodating chamber 42. The toner supplied into the toner accommodating chamber 42 is stirred by the stirring member 47 in the toner accommodating chamber 42.

In this embodiment, the toner in an amount corresponding to an amount of consumption of the toner from the developing device 4 is sequentially supplied from the toner cartridge 9 to the developing device 4. That is, in this embodiment, in an operation in a “normal print mode”, the toner amount in the developing device 4 is maintained substantially constantly at a predetermined target value (for example, 160 g). In this embodiment, the predetermined time value of the toner amount in the developing device 4 is also referred to as an “in-developing device target toner amount”. In this embodiment, the “in-developing device target toner amount” can be represented by a toner amount in the developing device 4 at the time of a start of an operation in a "printing continuation mode" described later (when a sequence enters the operation in the printing continuation mode), i.e., when toner out of the toner cartridge 9 is notified described later. Further, in this embodiment, the "in-developing device target toner amount" can also be represented by a toner amount in the developing device 4 after a first toner supplying operation after the toner cartridge 9 is exchanged. The "normal print mode" is an operation mode in which an image forming operation (printing) is performed in a state before the remaining toner amount in the toner cartridge 9 becomes 0%, i.e., in a state in which the toner can be sufficiently supplied from the toner cartridge 9 to the developing device 4 by an amount corresponding to an amount of the toner consumed from the developing device 4. That is, in this embodiment, the toner consumption amount of the developing device 4 and the toner supply amount from the toner cartridge 9 to the developing device 4 are substantially equal to each other.

Incidentally, the toner amount in the developing device 4 may only be required to be maintained within a predetermined range (within a predetermined fluctuation range) permitted from a viewpoint of suppressing deterioration of the toner. For example, there arises a difference between the toner consumption amount of the developing device 4 and the toner supply amount from the toner cartridge 9 to the developing device 4 during the image forming operation in some instances. In such a case, the toner discharging operation can be adjusted so that the toner amount in the developing device 4 is maintained substantially constant at the time of an end of the image forming operation, the time of a start of a subsequent image forming operation, and the like time. For example, in the case where the toner supply amount becomes smaller than the toner consumption amount during the image forming operation, at the time of the end of the image forming operation or the like time, the toner discharging operation can be continued until the toner amount in the developing device 4 becomes the in-developing device target toner amount. Further, for example, in the case where the toner supply amount becomes larger than the toner consumption amount during the image forming operation, at the time of the start of the subsequent image forming operation or the like time, the toner discharging operation can be stopped until the toner amount in the developing device 4 becomes the in-developing device target toner amount.

Further, in this embodiment, as described specifically later, the in-developing device target toner amount is set depending on the toner cartridge exchange number. By this, in this embodiment, the toner amount in the developing device 4 at the time of the start of the operation in the printing continuation mode described later is set depending on the toner cartridge exchange number.

Incidentally, the type of the toner discharging device 91 is not limited to the volume-variable pump type. For example, when the toner in a desired amount can be discharged at a desired timing, such as the case where a toner discharging screw as a conveying member is used, an arbitrary constitution can be employed.

Further, in this embodiment, on the toner cartridge 9, as shown in FIGS. 1 and 2, a toner cartridge memory MT (hereinafter, simply also referred to as a "memory MT") which is a non-volatile storing means (storing medium) is provided. In the toner cartridge memory MT, use information (information on use history) and lifetime information (information on exchange time (TG)) of the toner cartridge, and the like are stored. The toner cartridge memory MT functions as a memory tag for grasping information on the toner cartridge 9 on the apparatus main assembly 110 side. By this, even in the case where ON/OFF of a power source of the apparatus main assembly 110 and mounting and dismounting of the toner cartridge 9 are performed, on the basis of the above-described information stored in the toner cartridge memory MT, control according to the toner cartridge 9 can be appropriately carried out. That is, acquisition of a use status (use history) and the exchange time (lifetime) of the toner cartridge 9 can be made more accurately and more quickly. However, the present invention is not limited thereto, and in this embodiment, the information stored in the toner cartridge 9 may also be stored in a memory provided in the controller 120 of the apparatus main assembly 110 described later, for example.

<Detection of Toner Amount in Toner Cartridge>

In this embodiment, the toner amount (remaining toner amount) in the toner cartridge 9 is calculated on the basis of the above-described toner supply amount from the toner cartridge 9 to the developing device 4 and a toner amount in an initial toner cartridge 9. Incidentally, the initial toner cartridge 9 includes an unused (new) toner cartridge 9, and a toner cartridge 9 at the time of restart of use in the case where the toner cartridge 9 in the way of use is mounted on the developing device 4.

That is, the toner supply amount is obtained by measuring a time (toner discharging operation time) in which the clutch 70 for being drive-connected to the toner discharging device 91 is turned on (ON) and then by calculating the toner supply amount on the basis of a relationship, acquired in advance, between the toner discharging operation time and the toner discharge amount. Then, on the basis of the toner amount of the toner charged in the initial toner cartridge 9 and the toner supply amount from the toner cartridge 9 to the developing device 4, the toner amount (remaining toner amount) in the toner cartridge 9 is sequentially calculated. Specifically, the toner amount in the toner cartridge 9 can be calculated sequentially by "toner amount in the initial toner cartridge 9"−"toner supply amount from the toner cartridge 9 to the developing device 4".

Incidentally, in this embodiment, on the basis of the time in which the clutch 70 is ON, i.e., an operation time of the pump constituting the toner discharging device 91, the toner supply amount was calculated, but the present invention is not limited thereto. For example, in the case where the toner discharging device 91 is constituted by including the toner discharging screw, the toner supply amount may be calculated on the basis of a total number of rotations of the toner discharging screw. Further, as a detecting means for detecting the toner amount in the toner cartridge 9, similarly as in the detecting means for detecting the toner amount in the developing device 4, for example, the optical detection type, the electrostatic capacity type, the developer (toner) surface detection type, the weight detection type, and the like can be used irrespective of the detection type. Incidentally, the above-described detection types may be used in any combination or singly.

The toner cartridge 9 reaches the exchange time (timing) in the case where the toner accommodated therein is decreased in amount to a predetermined amount (typically, in the case where almost all the toner accommodated therein is discharged toward the developing device 4). A state in which the toner amount in the toner cartridge 9 is decreased to the predetermined amount and thus the toner cannot be sufficiently supplied from the toner cartridge 9 to the developing device 4 by an amount corresponding to an amount of the toner consumed from the developing device 4 (i.e., a state in which the toner cartridge 9 reaches the exchange time) is referred to as a "toner out". Specifically, a toner amount in a new toner cartridge 9 is defined as a remaining toner amount of 100%, and a state in which the toner amount in the toner cartridge 9 is decreased to a predetermined threshold is defined as a remaining toner amount of 0%. In this embodiment, the remaining toner amount of 0% corresponds to a state in which the toner in the toner cartridge 9 is substantially completely discharged. However, a state in which the toner somewhat remains in the toner cartridge 9 may be a state of the remaining toner amount of 0% (toner out). Further, the remaining toner amount may be evaluated by an index which is called the toner consumption amount. In that case, the toner consumption amount is 0% at the time of a new article, and a state in which the toner consumption amount is increased and the toner amount in the toner cartridge 9 is decreased to a predetermined threshold is defined as a toner consumption amount of 100%.

Use history values (the toner supply amount, the remaining toner amount) of the toner cartridge 9 are stored not only in the toner cartridge memory MT but also in the process cartridge memory MP. In this embodiment, the use history value of the toner cartridge 9 is increased by being counted in interrelation with an operation of the toner discharging device 91 of the toner cartridge 9. That is, the value history value of the toner cartridge 9 is increased with discharge of the toner from the toner cartridge 9 to the developing device 4. Further, in this embodiment, the image forming apparatus 100 executes processing of notifying the operator of the toner out of the toner cartridge 9 at the time when the remaining toner amount indicated by the use history value of the toner cartridge 9 reaches the predetermined threshold.

Incidentally, in this embodiment, information of the predetermined threshold of the toner amount in the toner cartridge 9 is stored in the toner cartridge memory MT (or the ROM 122) in advance. Further, in this embodiment, information of the in-developing device target toner amount acquired is described specifically later and is stored in the process cartridge memory MP.

<Control Constitution>

Parts (a) and (b) of FIG. 3 are schematic block diagrams each showing a control constitution of a principal part of the image forming apparatus 100 of this embodiment, in which part (a) shows a schematic constitution of the controller 120, and part (b) schematically shows a function block in the controller 120.

As shown in part (a) of FIG. 3, in the apparatus main assembly 110 of the image forming apparatus 100, the controller 120 as a control means is provided. The controller 120 is constituted by including a CPU 121 as a calculation (computation) processing means which is a central element for performing calculation processing, a ROM 122 and a RAM 123 which are storing means (storing media), an input/output circuit (not shown), and the like. In the ROM 122, a control program, a data table acquired in advance, and the like are stored. In the RAM 123, information inputted to the controller 120, detected information, a calculation result, and the like are stored. The input/output circuit controls input and output of signals between the controller 120 and devices connected to the controller 120.

To the controller 120, respective portions (various driving devices, various power sources, various sensors, and the like) of the image forming apparatus 100 are connected. The controller 120 bi-directionally communicates with the respective portions of the image forming apparatus 100. The controller 120 executes the image forming operation by controlling the respective portions of the image forming apparatus 100 on the basis of signals (start signal, image signal) inputted from an external device (not shown) such as a personal computer depending on and operation by the operator such as a user or a service person. Further, the controller 120 controls the supply of the toner from the toner discharging device 91 to the developing device 4 by controlling the clutch 70 for switching drive transmission to the toner discharging device 91 of the toner cartridge 9 and elimination of the drive transmission. Further, the controller 120 is capable of calculating the toner amount in the developing device 4 and the toner amount in the toner cartridge 9 by measuring the time in which the clutch 70 is ON. Further, to the controller 120, an image processing portion (video controller) 130 for generating image information used for forming the image in the image forming apparatus 100 on the basis of the signal inputted from the external device is connected. Further, the controller 120 counts the number of pixels of image information acquired from the image processing portion 130 and thus calculates the toner amount in the developing device 4. Further, the controller 120 reads the information from and writes the information in the process cartridge memory MP and the toner cartridge memory MT. Further, to the controller 120, an operation panel OP as an operating portion provided on the apparatus main assembly 110 is connected. The operation panel OP is constituted by including a displaying portion for displaying information to the operator by control of the controller 120, and an inputting portion for inputting information to the controller 120 depending on the operation by the operator.

As shown in part (b) of FIG. 3, in this embodiment, the controller 120 is provided with a developing device use history acquiring portion 201 and a supply container use history acquiring portion 202. The developing device use history acquiring portion 201 and the supply container use history acquiring portion 202 acquire the use history values (the toner consumption amount, the toner supply amount, the remaining toner amount) of the developing device 4 and the use history values (the toner supply amount, the remaining toner amount) of the toner cartridge 9, respectively, in the above-described manners. In this embodiment, the developing device use history acquiring portion 201 and the supply container use history acquiring portion 202 are realized by executing a program, stored in the ROM 122, by the CPU 121.

Further, as shown in part (b) of FIG. 3, the controller 120 is provided with a toner cartridge exchange number measuring portion 203 and an in-developing device target toner amount acquiring portion 204 as a setting portion. The toner cartridge exchange number measuring portion 203 counts a toner cartridge embodiment as described specifically later. The in-developing device target toner amount acquiring portion 204 acquires the in-developing device target toner amount as described specifically later. In this embodiment, the toner cartridge exchange number measuring portion 203 and the in-developing device target toner amount toner amount acquiring portion 204 are realized by executing a program, stored in the ROM 122, by the CPU 121.

Further, as shown in part (b) of FIG. 3, the CPU 121 is provided with a toner out notifying portion 205 as a first notifying portion and a printing continuation mode end notifying portion 206 as a second notifying portion. The toner out notifying portion 205 executes processing for notifying the operator of toner out of the toner cartridge 9 as described specifically later. The printing continuation mode end notifying portion 206 executes processing for notifying the operator of an end of the operation in the printing continuation mode as described specifically later. In this embodiment, each of the toner out notifying portion 205 and the printing continuation mode end notifying portion 206 provides associated notification to the operator by causing the displaying portion of the operation panel OP to display associated information. In this embodiment, each of the toner out notifying portion 205 and the printing continuation mode end notifying portion 206 is realized by executing a program, stored in the ROM 122, by the CPU 121.

<Start and End (Operation End of the Process Container) of Operation in Printing Continuation Mode>

In this embodiment, the image forming apparatus 100 is operable in the "printing continuation mode" in which the image forming apparatus 100 is capable of continuing the image forming operation (printing) even in a state in which the toner cannot be supplied from the toner cartridge 9 to the developing device 4. That is, the "printing continuation mode" is an operation mode for continuing the image forming operation (printing) by using the toner remaining in the developing device 4 in a state in which the remaining toner amount in the toner cartridge 9 becomes 0% or is closer thereto and the toner in an amount required by the developing device 4 cannot be supplied.

Further, in this embodiment, when the operation in the printing continuation mode is started, the image forming apparatus 100 ends the operation in the printing continuation mode at a timing when the toner in an amount corresponding to a "usable toner amount" which is a toner amount of the use usable in the operation in the printing continuation mode is used up.

<Toner Cartridge Exchange Number>

Next, a counting method of the toner cartridge exchange number in this embodiment will be described.

The toner cartridge 9 is exchanged to a new toner cartridge 9 with the remaining toner amount of 100% from the used-up toner cartridge 9 with the remaining toner amount of 0%, and at the time when use of the new toner cartridge 9 is started, the new toner cartridge 9 can be counted as an (n+1)th toner cartridge 9 (n=integer of 0 or more). In this case, the toner cartridge exchange number is represented by an integer value such as an exchange number of 0 (first) and an exchange number of 1 (second). Further, the toner cartridge embodiment may be represented by the exchange number of 0 (first) and the exchange number of 1 (second) or may also be represented by a fractional value such as (n+0.6)th in interrelation with a detection result of the remaining toner amount in the toner cartridge 9.

Whether or not the toner cartridge 9 is exchanged is discriminated (counted) by the toner cartridge exchange number measuring portion 203 on the basis of information stored in the toner cartridge memory MT. For example, on the basis of the remaining toner amount in the toner cartridge 9 stored in the toner cartridge memory MT, the toner cartridge exchange number measuring portion 203 can discriminate that the toner cartridge 9 was exchanged from the above-described change in remaining toner amount. Further, on the basis of information in the toner cartridge memory MT indicating whether or not the toner cartridge 9 is a new article, the toner cartridge exchange number measuring portion 203 can discriminate that the toner cartridge 9 was exchanged. As the information indicating whether or not the toner cartridge 9 is the new article, it is possible to cite presence or absence of information indicating that the toner cartridge 9 is the new article and presence or absence of information indicating that the toner cartridge 9 is used up. Incidentally, on the basis of the information stored in the process cartridge memory MP, the toner cartridge exchange number measuring portion 203 may discriminate whether or not the toner cartridge 9 was exchanged. For example, similarly as described above, on the basis of the remaining toner amount in the toner cartridge 9 stored in the developing cartridge memory MP, the toner cartridge exchange number measuring portion 203 can discriminate that the toner cartridge 9 was exchanged.

In this embodiment, the toner cartridge exchange number measuring portion 203 counts the toner cartridge exchange number as an integer value showing that the toner cartridge 9 reached the toner out and the toner cartridge 9 was exchanged. Further, the toner cartridge exchange number measuring portion 203 causes the process cartridge memory MP to store the counted toner cartridge exchange number.

Incidentally, in this embodiment, the used-up toner cartridge 9 was the toner cartridge 9 in a state (remaining toner amount: 0%) in which the toner cartridge exchange number reached the toner out, i.e., the toner accommodated inside the toner cartridge 9 is substantially completely discharged, but the present invention is not limited thereto. Even in a state in which the remaining toner amount does not reach 0%, i.e., for example, even when the toner cartridge 9 is in a state of a used toner cartridge 9 with a remaining toner amount of 60%, the toner cartridge exchange number can be counted as the used-up toner cartridge 9.

<Determination of In-Developing Device Target Toner Amount Depending on Toner Cartridge Exchange Number>

Next, determination of the in-developing device target toner amount in this embodiment will be described. FIG. 4 is a flowchart for illustrating a control sequence of the operation of the image forming apparatus 100 in this embodiment. In this embodiment, the controller 120 executes processing for notifying the end of the operation in the printing continuation mode by performing respective processes of the sequence shown in FIG. 4. Incidentally, FIG. 4 shows a procedure of an outline of the operation of the image forming apparatus 100 through the mounting of the toner cartridge 9, the start and the end of the operation in the printing continuation mode, and the exchange of the toner cartridge 9. Further, for simplification, description is made in some instances on the assumption that a main body performing processes by the develop various function blocks in the controller 120 is the controller 120. Further, in this embodiment, it is assumed that in the image forming operation, an image with a standard print ratio set in advance is formed. Here, the print ratio corresponds to a print area (toner consumption amount per one sheet) of the image formed on a single recording material P. Control of a use status of the developing device 4 such as the print ratio of the image formed in the image forming operation will be described later. In the following, respective steps will be described.

(A Region: Normal Printing Mode)

S101: The controller 120 detects that the process cartridge 10 and the toner cartridge 9 are mounted in the apparatus main assembly 110. The controller 120 is capable of detecting the mounting of each of the process cartridge 10 and the toner cartridge 9 in the apparatus main assembly 110 on the basis of associated signals from sensors (not shown) for detecting open/close of the top cover 111 and associated one of the process cartridge 10 and the toner cartridge 9.

S102: The controller 120 counts the toner cartridge exchange number by reading the information stored in the toner cartridge memory MT. The controller 120 writes the counted toner cartridge exchange number in the process cartridge memory MP and causes the process cartridge memory MP to store (renew) the toner cartridge exchange number.

S103: the controller 120 reads the toner cartridge exchange number counted and stored in the process cartridge memory MP and acquires the in-developing device target toner amount depending on the read toner cartridge exchange number. Then, the controller 120 controls the toner discharging device 91 (clutch 70) so as to supply the toner from the toner cartridge 9 to the developing device 4 until the toner amount in the developing device 4 becomes the acquired in-developing device target toner amount.

That is, the controller 120 acquires the in-developing device target toner amount which is a target value of the toner amount in the developing device 4 in the in-developing device target toner amount acquiring portion 204. At this time, the in-developing device target toner amount acquiring portion 204 acquires the in-developing device target toner amount depending on the toner cartridge exchange number measured by the toner cartridge exchange number measuring portion 203 and stored in the process cartridge memory MP. Then, on the basis of the use history value of the developing device 4 acquired by the developing device use history acquiring portion 201 and the use history value of the toner cartridge acquired by the supply container use history acquiring portion 202, the controller 120 causes the toner discharging device 91 by a time necessary to increase the toner amount 4 to the in-developing device target toner amount, so that the toner is supplied from the toner cartridge 9 to the developing device 4. Incidentally, a setting of the in-developing device target toner amount depending on the toner cartridge exchange number will be described specifically later.

S104: The controller 120 executes the image forming operation and prints the image on the recording material P.

(T Region: Toner Out of Toner Cartridge 9 "Toner Out Notification")

S105: The controller 120 not only continues the printing, but also increases the use history values of the process cartridge 10 and the toner cartridge 9 with the toner discharging operation from the toner cartridge 9 (causes (renews) the memory MP and the memory MT to store the use history values). Then, when the remaining toner amount in the toner cartridge 9 shown by the use history value of the toner cartridge 9 reaches a predetermined threshold, the toner cartridge 9 reaches a state of the remaining toner amount of 0% (i.e., toner out).

Then, with the toner discharging operation, the toner cannot be sufficiently supplied from the toner cartridge 9 to the developing device 4. In the case where the toner cartridge 9 reaches the toner out, the controller 120 executes processing for notifying the toner out of the toner cartridge 9 to the operator. In this embodiment, notification of the toner out of the toner cartridge 9 is made by display in the operation panel OP. Further, the controller 120 is capable of showing (typically, stopping) the toner discharging operation of the toner discharging device 91 after notifying the toner out of the toner cartridge 9. Incidentally, the contents of the toner out notification may only be required to relate to the exchange of the toner cartridge 9, and as the toner out notification, it is possible to cite display indicating that the toner cartridge 9 reaches the toner out, and in addition thereto or instead thereof, display providing an instruction to exchange the toner cartridge 9, and the like. The contents of the toner out notification typically include a message prompting the operator to exchange the toner cartridge 9. However, the contents of the toner out notification may also be displayed or the like indicating that the toner cartridge 9 reaches the toner out or that the remaining toner amount is 0%, and this display can also be said to relate to the exchange of the toner cartridge 9.

S106: In a state in which the toner out of the toner cartridge 9 is notified in S105, the controller 120 causes the operation panel OP to display information prompting the operator to select whether to enter the operation in the printing continuation mode. The term "enter the operation in the printing continuation mode" refers to that the printing is continued by using the process cartridge 10 (developing device 4) in use without performing the exchange of the toner cartridge 9. Further, "not to enter the operation in the printing continuation mode" refers to that the printing using the process cartridge 10 (developing device 4) in use is stopped. For example, in the case where preparation (such as purchase) of a toner cartridge 9 subsequently used is not made or in the like case, the operator can continue the printing by selecting entrance into the operation in the printing continuation mode. On the other hand, in the case where the preparation (such as purchase) of the toner cartridge 9 subsequently used has ready been made and the toner cartridge 9 (currently used) can be exchanged or in the like cases, the operator can select not to enter the operation in the printing continuation mode.

Incidentally, in the case where "not to enter the operation in the printing continuation mode" is selected in S106 by the operator, the controller 120 stops the printing (prohibits execution of the image forming operation) until the current toner cartridge 9 is exchanged to the new toner cartridge 9 (S110). Thereafter, typically, the exchange of the toner cartridge 9 is made by the operator. When the toner cartridge 9 is exchanged, the image forming apparatus 100 is capable of performing the printing (operation) in the printing continuation mode again.

S107: In the case where the entrance into the operation in the printing continuation mode is selected in S105, the controller 120 acquires the usable toner amount which is read in advance and stored in the process cartridge memory MP and which is the toner amount usable in the operation in the printing continuation mode.

S108: The controller 120 continues the printing in the printing continuation mode.

(E Region: End of Operation in Printing Continuation Mode "Printing Continuation Mode End Notification")

S109: The controller 120 detects that the toner consumption amount after the sequence enters the operation in the printing continuation mode (after the toner out of the toner cartridge 9 is notified in S105) reaches the usable toner amount stored in the process cartridge memory MP. Then, in the case where the toner consumption amount in the operation in the printing continuation mode reaches the usable toner amount, the controller 120 executes processing for notifying the operator of an end of the operation in the printing continuation mode. In this embodiment, the notification of the end of the operation in the printing continuation mode is made by display in the operation panel OP. Further, the controller 120 stops the printing substantially simultaneous with or after the notification of the end of the operation in the printing continuation mode. Thereafter, typically, the exchange of the toner cartridge 9 is made by the operator. When the toner cartridge 9 is exchanged, the image forming apparatus 100 is capable of performing the printing in the printing continuation mode again.

Incidentally, the contents of the printing continuation mode (operation) end notification may only be required to relate to the end of the operation in the printing continuation mode, and as the printing continuation mode end notification, it is possible to cite display showing that the operation in the printing continuation mode is ended (the timing reaches an end time) or in addition thereto or instead thereof, display providing an instruction to exchange the toner cartridge 9, and the like. The contents of the printing continuation mode end notification typically include a message notifying the operator of the end of the operation in the printing continuation mode (arrival of the timing at the end time, a message prompting the operator to exchange the toner cartridge 9, and the like message). However, the contents of the printing continuation mode end notification may also be display or the like simply showing that the remaining usable toner amount runs out (remaining toner amount: 0%), and this display can also be said to relate to notification of the end of the operation in the printing continuation mode to the operator.

That is, the controller 120 acquires the toner consumption amount of the developing device 4 by the developing device use history acquiring portion 201. Further, in the printing continuation mode end notifying portion 206, the controller 120 acquires the usable toner amount as a threshold of the toner consumption amount of the developing device 4 in the operation in the printing continuation mode. Then, in the printing continuation mode end notifying portion 206, the controller 120 discriminates whether or not the toner consumption amount of the developing device 4 reached the usable toner amount, by comparing the toner consumption amount of the developing device 4 in the operation in the printing continuation mode and the usable toner amount with each other. Incidentally, in this embodiment, a toner amount in the developing device 4 when the printing continuation mode end notification is made is larger than a toner amount in the toner cartridge 9 when the toner out notification is made.

Evaluation Experiment 1

(Method)

Next, an evaluation experiment 1 in which an effect of this embodiment was evaluated will be described. In the evaluation experiment 1, an image forming operation in which images were formed on 200000 sheets of recording materials P was performed. In this image forming operation, as image data, horizontal lines with an image print ratio of 5% were used. The image forming operation was continued while successively supplying, from the toner cartridge 9 to the developing device 4, the toner in an amount corresponding to an amount of consumption from the developing device 4. Further, in the evaluation experiment 1, in order to forcedly reproduce a state in which the toner cannot be supplied from the toner cartridge 9 to the developing device 4, the sequence always entered the operation in the printing continuation mode. Thereafter, in the case where the end of the operation in the printing continuation mode is notified, the exchange of the toner cartridge 9 was made.

In this embodiment, the in-developing device target toner amount was set in the following manner depending on the toner cartridge exchange number. That is, the in-developing device target toner amount usable toner amount is made larger with an increasing toner cartridge exchange number. Further, in the evaluation experiment 1, the toner cartridge exchange number was counted as an integer value. Further, in the evaluation experiment 1, a use environment of the image forming apparatus 100 was 23° C./50% RH. Incidentally, information indicating a relationship between the toner cartridge exchange number and the in-developing device target toner amount is set in advance and stored as table data or the like in the process cartridge memory MP (or the ROM 122). When the toner amount is below the in-developing device target toner amount, the in-developing device target toner amount is set in advance as a toner amount in which there is a possibility of an occurrence of an image defect such as a fog due to toner accumulated and deteriorated in the developing device 4. Further, in this embodiment, the usable toner amount of the toner which can be used by the developing device 4 in the operation in the printing continuation mode was set uniformly to 60 g. A toner amount (remaining toner amount) in the developing device 4 at the time when the operation in the printing continuation mode is ended is shown in combination with a setting of the in-developing device target toner amount depending on the toner cartridge exchange number shown below.

First toner cartridge (exchange number of 0): in-developing device target toner amount of 160 g (remaining toner amount at the time of printing continuation mode end: 100 g)

Second toner cartridge (exchange number of 1):
in-developing device target toner amount of 180 g (remaining toner amount at the time of printing continuation mode end: 120 g)

Third toner cartridge (exchange number of 2):
in-developing device target toner amount of 200 g (remaining toner amount at the time of printing continuation mode end: 140 g)

Fourth toner cartridge (exchange number of 3):
in-developing device target toner amount of 220 g (remaining toner amount at the time of printing continuation mode end: 160 g)

On the other hand, as a comparison example 1, also as regards the case where the in-developing device target toner amount is made constant irrespective of the toner cartridge exchange number, a similar experiment was conducted. FIG. 7 is a flowchart for illustrating a control sequence of the image forming apparatus 100 including the exchange of the toner cartridge 9 in the comparison example 1. Process S901 and S903 to S909 in FIG. 7 are similar to the processes S101 and S104 to S110 in FIG. 4, respectively. On the other hand, in the comparison example 1, a step, corresponding to S102 in FIG. 4, in which the toner cartridge exchange number is counted is not provided. Further, in the comparison example 1, after the toner cartridge 9 is mounted in the image forming apparatus 100 (S901), the in-developing device target toner amount is set uniformly to 160 g irrespective of the toner cartridge exchange number (S902), and then the printing is performed (S903). Further, also, in the comparison example 1, similarly as in this embodiment, the usable toner amount of the toner which can be used by the developing device 4 in the operation in the printing continuation mode was set uniformly to 60 g.

(Result)

A result of the comparison example 1 is shown in a table 1 below. Occurrence or non-occurrence of a fog was measured by the following measuring method with use of a white photometer ("TC-6DS/A", manufactured by Tokyo Denshoku Co., Ltd.) (this is the same in evaluation experiments described later). Whiteness (reflectance D1 (%)) of paper used for printing and whiteness (reflectance D2 (%)) of paper not used for the printing were measured, and from a difference therebetween, a fog (%) (=D2 (%)−D1 (%)) was measured. Evaluation was made such that the case where the fog is 0% or more and less than 1% was evaluates as "○" (not occurred), the case where the fog is 1% or more and less than 3% was evaluated as "Δ" (slightly occurred), and the case where the fog is 3% or more was evaluated as "x" (occurred).

In the comparison example 1, the fog slightly occurred (1.6%) before the exchange of the second toner cartridge ("TC") (exchange number ("EN") of 1), and occurred (4.5%) before the exchange of the third toner cartridge (exchange number of 2). This would be considered because the in-developing device target toner amount is not changed depending on the toner cartridge exchange number as described specifically later. On the other hand, in this embodiment, the fog of 1% or more did not occur for either one of the second toner cartridge (exchange number of 1), the third toner cartridge (exchange number of 2), and the fourth toner cartridge (exchange number of 3). This would be considered because the in-developing device target toner amount is changed depending on the toner cartridge exchange number as described specifically later.

TABLE 1

| 23° C./ 50% RH | 1ST TC (EN: 0) | 2ND TC (EN: 1) | 3RD TC (EN: 2) | 4TH TC (EN: 3) |
|---|---|---|---|---|
| EMB. 1 | ○ | ○ | ○ | ○ |
| COMP. EX. 1 | ○ | Δ | X | X |

Incidentally, in this embodiment, it was assumed that the sequence enters the operation in the printing continuation mode, but a flow of an operation until the printing is performed again in the case where the sequence does not enter the operation in the printing continuation mode. The toner out of the toner cartridge 9 is notified, and thereafter, the printing is stopped. Then, when a new (fresh) toner cartridge 9 is mounted in the image forming apparatus 100, the toner is supplied from the toner cartridge 9 to the developing device 4 so that the toner amount in the developing device 4 becomes the in-developing device target toner amount depending on the toner cartridge exchange number as described above. Thereafter the printing is performed again.

(State of Toner in Comparison Example 1)

Next, using FIGS. 8 and 9, the toner amount in the developing device 4 and a state of the toner in the developing device 4 in the comparison example 1 will be described. In FIG. 8, an upper stage schematically illustrates the toner cartridge 9 and the toner amount therein, and a lower stage schematically illustrates the developing device 4 and the toner amount therein. FIG. 9 is a graph showing a relationship between the number of sheets printed and a toner deterioration degree of the toner in the developing device 4, in which the abscissa represents the number of sheets printed and the ordinate represents the toner deterioration degree. Here, the toner deterioration degree shows that with a larger value, a change in toner state such as embedding of an external additive of the toner move advances. As regards the toner, there is a tendency that the deterioration degree advances more (becomes higher) as the toner exits in the developing device 4 for a longer time and the amount of the toner in the developing device 4 becomes smaller. Further, there is a tendency that when new (fresh) toner which is not deteriorated is supplied to the developing device 4, an average deterioration degree of an entirety of the toner in the developing device 4 is alleviated (becomes small). An example of conversion into numerical from the toner deterioration degree will be described more specifically later in an embodiment 3. Incidentally, A, B, T, E in FIGS. 8 and 9 correspond to the A region, the B region, the T region, and the E region, respectively, described above, and A1, A2, and A3 show the A regions for the first toner cartridge, the second toner cartridge, and the third toner cartridge, respectively (this is true for B1, B2, E1, and E2).

First, an operation for the first toner cartridge will be described.

A1 Region: Normal Printing Mode

From the first toner cartridge (exchange number of 0), the toner is successively supplied to the developing device 4, so that the toner amount in the developing device 4 is kept substantially constant at the in-developing device target toner amount. The toner is successively supplied to the developing device 4, and therefore, relative to an increase in number of sheets printed, the toner deterioration degree moderately advances.

B1 Region: Start of Operation in Printing Continuation Mode "Printing Continuation Mode Selection Notification"

At the time of a start of the operation in the printing continuation mode (when the sequence enters the operation in the printing continuation mode, when the sequence enters the B1 region), i.e., when the toner out notification is made, the toner amount in the developing device 4 corresponds to the in-developing device target toner amount set irrespective of the toner cartridge exchange number. The operation in the printing continuation mode is started, and the toner accumulated in the developing device 4 is consumed. Only the toner accumulated in the developing device 4 is valued and the printing is continued, and therefore, the toner deterioration degree in the developing device 4 quickly advances (increases).

E1 Region: End of Operation in Printing Continuation Mode "Printing Continuation Mode End Notification"

In order to suppress the occurrence of the image defect due to the deteriorated toner, "residual toner 1" shown in FIG. 8 is left in the developing device 4, and the operation in the printing continuation mode is ended.

E1 Region to A2 Region

The toner cartridge 9 is exchanged (the second toner cartridge is mounted), and when the toner is supplied to the developing device 4, the toner deterioration degree remarkably decreases.

Subsequently, an operation for the second toner cartridge (exchange number of 1) will be described. When the toner is successively supplied again to the developing device 4 (A2 region) and the remaining toner amount in the toner cartridge 9 becomes 0% (T region), the operation in the printing continuation mode is started (B2 region) and is ended while leaving "residual toner 2" in the developing device 4 (E2 region). The toner amount in the developing device 4 when the sequence enters the B2 region corresponds to the in-developing device target toner amount set irrespective of the toner cartridge exchange number.

An operation for the third toner cartridge and later is similar to the operation for the second toner cartridge. For that reason, the operation for the third toner cartridge and later will be omitted from description. Incidentally, in the operation for the third toner cartridge, the operation in the printing continuation mode is ended while leaving "residual toner 3" in the developing device 4.

Here, in the case where the number of uses of the toner cartridge 9 is changed from 1 to 2 (changed in exchange number from 0 to 1), the "residual toner 2" remaining in the developing device 4 possesses a property different from the "residual toner 1". Specifically, a part of the "residual toner 2" causes abnormality in charging property and shape in an amount more than the "residual toner 1" in some instances. Further, also in the case where the number of uses of the toner cartridge 9 is changed from 2 to 3 (changed in exchange number from 1 to 2), similarly, the "residual toner 3" causes abnormality in charging property and shape in an amount more than the "residual toner 1" and the "residual toner 2" in some cases.

For example, in the case where the charging property (charging amount) of a part of value is excessively larger than a proper distribution, the number of times when this high chargeable toner is carried on the developing roller 43 in the developing device 4 becomes excessively large. For that reason, deterioration of the high chargeable toner advances. Further, in the case where a particle size of the part of the toner is excessively larger than a proper distribution, irregular-shaped toner of which particle size is excessively larger than the proper distribution is not carried on the developing roller 43 in the developing device 4 and does not relate to the image formation such as the development. For that reason, deterioration of the toner other than the irregular-shaped toner advances. Further, as the number of uses of the toner cartridge 9 for a single developing device 4 (process cartridge 10) is increased to 2, 3, . . . , the toner out of a proper charging property and the proper particle size distribution as described above is accumulated in a larger amount in the developing device 4.

By accumulation of the toner out of the proper charging property and the proper particle size distribution as described above, as shown in FIG. 9, a broken line indicating the toner deterioration degree exceeds a threshold of the toner deterioration degree at which the image defect such as a fog occurs. That is, to such toner out of the proper charging property and the proper particle size distribution, a normal toner deterioration simulation cannot be applied, so that the toner deterioration degree of the toner remaining in the developing device 4 in the operation in the printing continuation mode cannot be appropriately estimated. For that reason, in the case of the comparison example 1, in the operation in the printing continuation mode for the second toner cartridge, a problematic fog occurred.

(State of Toner in this Embodiment)

Next, using FIGS. 5 and 6, the toner amount in the developing device 4 and the toner state in the developing device 4 in this embodiment will be described. In FIG. 5, an upper state schematically illustrates the toner cartridge 9 and the toner amount (of the toner) therein, and a lower stage schematically illustrates the developing device 4 and the toner amount therein. FIG. 6 is a graph showing a relationship between the number of sheets printed and the toner deterioration degree of the toner in the developing device 4, in which the abscissa represents the number of sheets printed, and the ordinate represents the toner deterioration degree.

The operations in the regions of A1, B1, A2, B2, and A3 are similar to those, respectively, in the comparison example 1 described using FIG. 8. However, in this embodiment, the in-developing device target toner amount is increased every increase in toner cartridge exchange number.

Here, in this embodiment, in the case where the number of uses of the toner cartridge 9 is changed from 1 to 2 (the exchange number is changed from 0 to 1), the in-developing device target toner amount was increased in consideration of states of the "residual toner 1" which remains in the developing device 4. Further, in this embodiment, in the case where the number of uses of the toner cartridge 9 is changed from 2 to 3 (the exchange number is changed from 1 to 2), the in-developing device target toner amount was further increased in consideration of states of the "residual toner 2" in the developing device 4. The toner amount in the developing device 4 when the sequence enters the B1 region (at the time of the start of the operation in the printing continuation mode in the toner cartridge exchange number of 0) corresponds to the in-developing device target toner amount set correspondingly to the toner cartridge exchange number of 0. The toner amount in the developing device 4 when the sequence enters the B2 region (at the time of the start of the operation in the printing continuation mode in the toner cartridge exchange number of 1) corresponds to the in-developing device target toner amount set correspondingly to the toner cartridge exchange number of 1. The toner amount in the developing device 4 when the sequence enters the B3 region (at the time of the start of the operation in the printing continuation mode in the toner cartridge exchange number of 2) corresponds to the in-developing device target toner amount set correspondingly to the toner cartridge exchange number of 2.

In this embodiment, even when the above-described value out of the proper charging property and the proper particle size distribution is accumulated in the developing device 4, the toner in the developing device 4 is increased in amount, and a proportion of the deteriorated toner to entirety of the toner in the developing device 4 is decreased, so that a deterioration speed can be slowed. That is, in this embodiment, as shown in FIG. 6, a solid line (broken line in the comparison example 1) indicating the toner deterioration degree does not exceed a threshold of the toner deterioration degree at which the image defect such as the fog occurs. By this, in this embodiment, even in the case where the exchange number of the process for the single developing device 4 (process cartridge 10) is increased, the toner deterioration degree of the toner remaining in the developing device 4 in the operation in the printing continuation mode can be properly estimated. For that reason, in this embodiment, even in the operation in the printing continuation mode for the second toner cartridge and later, occurrence of the problematic fog can be suppressed.

Incidentally, a value of the usable toner amount which is the toner amount of the toner usable in the operation in the printing continuation mode is not limited to the value in this embodiment, but can be appropriately made depending on a device constitution, a toner characteristic, and the like, and may be made smaller or larger than the value in this embodiment.

Further, in this embodiment, the toner in the amount corresponding to the amount of the toner consumed from the developing device 4 was successively supplied from the developing device 4, but for example, may be periodically supplied in the case where the toner amount in the developing device 4 is decreased to a predetermined amount or in the case where the toner is consumed from the developing device by a predetermined amount.

Further, the in-developing device target toner amount can be changed depending on a capacity of the toner cartridge mounted in the image forming apparatus 100. That is, in some instances, the image forming apparatus 100 has a constitution in which toner cartridges 9 different in capacity (toner amount of the toner accommodated in an initial stage) are connectable to a single developing device 4 (process cartridge 10). In such a constitution, the in-developing device target toner amount in the case where the toner cartridge 9 with a first capacity is connected to the developing device 4 is defined as a first target toner amount. Further, the in-developing device target toner amount in the case where the toner cartridge 9 with a second capacity larger than the first capacity is connected to the developing device 4 is defined as a second target toner amount. Further, for example, in the case where the toner cartridge exchange number is the same, the second target toner amount can be made larger than the first target toner amount. By this, an effect such that the toner amount in the developing device 4 is increased depending on the capacity of the toner cartridge 9 and the proportion of the deterioration toner to the entirety of the toner in the developing device 4 is decreased and thus the deterioration speed is slowed can be enhanced. Information on the capacity of the toner cartridge 9 can be acquired from the information stored in the toner cartridge memory MT, for example.

Further, a lifetime of the process cartridge 10 may be separately set on the basis of a surface movement distance (index value of a use amount) of the developing roller 43 in the developing device 4 a surface movement distance (index value of a use amount) of the photosensitive drum 1, and the like.

Thus, in this embodiment, the image forming apparatus 100 includes the image bearing member (photosensitive drum) 1 configured to bear a developer image, the developing device 4 which includes the developing member (developing roller) 43 for forming the developer image on the image bearing member 1 by supplying a developer to the image bearing member 1 and the accommodating portion (developing container) 41 for accommodating the developer supplied to the developing member 43 and to which the supply container (toner cartridge) 9 accommodating the developer supplied to the accommodating portion 41 is detachably mountable, the first developer amount acquiring portion (supply container use history acquiring portion) 202 configured to acquire first developer amount information on a developer amount of the developer in the supply container connected to the developing device, the second developer amount acquiring portion (developing device use history acquiring portion) 201 configured to acquire second developer amount information on a developer amount of the developer in the accommodating portion, and the first notifying portion (toner out notifying portion) 205 configured to provide first notification (toner out notification) on an exchange of the supply container in a case that the developer in the supply container 9 is decreased in amount by being supplied from the supply container 9 to the accommodating portion 41 and then the developer amount of the developer in the supply container 9 indicated by the first developer amount information reaches a predetermined developer amount. After the first notification is provided by the first notifying portion 205, until the supply container 9 connected to the developing device 4 is exchanged, the operation in the operation mode (printing continuation mode) in which the developer image can be formed by the developing device 4 is capable of being executed. Further, in this embodiment, the image forming apparatus 100 includes the storing portion (process cartridge memory) MP configured to store exchange number information on a number of times of the exchange of the supply container 9 for the developing device 4, the setting portion (in-developing device target toner amount acquiring portion) 204 configured to set a start developer amount (corresponding to the in-developing device target toner amount in this embodiment) which is a developer amount in the accommodating container 41 at the time of the start of the operation in the operation mode, and the second notifying portion (printing continuation mode end notifying portion) 206 configured to provide second notification (printing continuation mode end notification) notifying an end of the operation in the operation mode in a case that after the operation in the operation mode is started, a use amount of the developer from the developing device 4 indicated by the second developer information reaches a predetermined usable amount (usable toner amount). The setting portion 204 sets the above-described in-developing device target toner amount depending on the above-described exchange number information. In this embodiment, the setting portion 204 sets the in-developing device target toner amount in a case that the exchange number indicated by the exchange number information is a first exchange number, to a first value, and sets the in-developing device target toner amount in a case that the exchange number indicated by the exchange number information is a second exchange number larger than the first exchange number, to a second value larger than the first value.

Further, in this embodiment, the setting portion 204 changes the above-described setting of the in-developing device target toner amount by changing a setting of a target developer amount which is a target value of the developer amount in the accommodating portion 41 in the supplying operation of the developer from the supply container 9 to the accommodating portion 41. Further, in this embodiment, the image forming apparatus 100 includes the toner discharging device 91 configured to discharge the developer from the supply container 9 toward the accommodating portion 41, and the controller 120 configured to control the toner discharging device 91. The controller 120 controls the toner discharging device 91 so that before the developer amount of the developer in the supply container 9 indicated by the first developer amount information reaches the predetermined developer amount, the developer amount of the developer in the accommodating portion 41 indicated by the second developer amount information is maintained within a predetermined range relative to the above-described target developer amount by successively supplying the developer from the supply container 9 to the accommodating portion 41 with use of the developer from the developing device. Typically, the predetermined developer amount is an amount in which the developer is not capable of being supplied from the supply container 9 to the accommodating portion 41. Further, typically, the predetermined developer amount is an amount in which a discharge amount of the developer from the supply container 9 by a predetermined operation of the toner discharging device 91 is smaller than a predetermined discharge amount. Further, in this embodiment, the above-described predetermined amount is set irrespective of the above-described exchange number. Further, in this embodiment, the developing device 4 is detachably mountable to the apparatus main assembly 110 of the image forming apparatus 100. Further, in this embodiment, the storing portion MP is detachably mountable together with the developing device 4 to the apparatus main assembly 110.

As described above, in this embodiment, the image forming apparatus 100 is capable of executing the operation in the printing continuation mode in which the image forming operation is capable of being continued in the state in which the toner cannot be sufficiently supplied from the toner cartridge 9 to the developing device 4. Further, in this embodiment, in such a constitution, the in-developing device target toner amount is set depending on the toner cartridge exchange number, so that the toner amount in the developing device 4 at the time of the start of the operation in the printing continuation mode is set depending on the toner cartridge exchange number. By this, according to this embodiment, until the end of the operation in the printing continuation mode, a good image can be formed by suppressing the occurrence of the image defect, due to the deteriorated toner.

Next, a modified embodiment of this embodiment will be described. In this modified embodiment, an example in which timings of the "toner out notification" (S105) and the "printing continuation mode selection mode" (S106) in the sequence shown in FIG. 4 are changed will be described. Each of FIGS. 10 and 11 is a flowchart for illustrating a control sequence of the image forming apparatus 100 in this modified embodiment.

The sequence shown in FIG. 10 is different from the sequence shown in FIG. 4 in timing of selecting whether or not the sequence enters the operation in the printing continuation mode. Specifically, in the sequence shown in FIG. 10, the timing of selecting whether or not the sequence enters the operation in the printing continuation mode (S306) is earlier than a timing of notifying the toner out of the toner cartridge 9 (S305). By employing such a sequence, before the toner out of the toner cartridge 9 is notified, whether or not the sequence enters the operation in the printing continuation mode can be determined in advance. Incidentally, processes of S301 to S309 are similar to the processes of S101 to S109 of FIG. 4, respectively. In FIG. 10, in S310, printing is executed, and in S311, depending on selection that the sequence does not enter the operation in the printing continuation mode in S306, not only the toner out of the toner cartridge 9 is notified, but also the printing is stopped.

Further, a sequence showing in FIG. 11 is different from the sequence shown in FIG. 4 in that there is no step of selecting whether or not the sequence enters the operation in the printing continuation mode. Specifically, after a timing of notifying the toner out of the toner cartridge 9 (S405), the sequence enters the operation in the printing continuation mode without requiring any selection to the operator (S406). By employing such a sequence, the operator is capable of continuing the use of the image forming apparatus 100 without being conscious of the operation in the printing continuation mode. Further, by employing such a sequence, it would be considered that management of the image forming apparatus 100 becomes easy. Incidentally, processes of S401 to S405 and S407 to S409 of FIG. 11 are similar to the processes of S101 to S105 and S107 to S109, respectively, of FIG. 4.

Next, another embodiment (embodiment 2) of the present invention will be described. Basic constitution and operation of an image forming apparatus of this embodiment are the same as those of the image forming apparatus of the embodiment 1. Accordingly, in the image forming apparatus of this embodiment, elements having identical or corresponding functions or constitutions to those of the image forming apparatus of the embodiment 1 will be omitted from detailed description by adding the same reference numerals or symbols as those in the embodiment 1.

In the embodiment 1, on the assumption that an image with a normal print ratio set in advance is formed in the image forming operation, an in-developing device target toner amount depending on the toner cartridge exchange number was provided.

Here, a state of the toner remaining in the developing device 4 when the toner cartridge 9 is exchanged changes depending on a value status of the developing device 4 such as a print ratio of the image formed in the image forming operation. In the case where an image with a relatively low print ratio is continuously formed in the image forming operation, an amount of the toner consumed is small and a toner replacing effect by supply is low, and therefore, advance of the deterioration degree of the toner remaining in the developing device 4 when the toner cartridge 9 is exchanged is relatively large. On the other hand, in the case where an image with a relatively high print ratio is continuously formed in the image forming operation, the amount of the toner consumed is high and the toner replacing effect is high, and therefore, the advance of the deterioration degree of the toner remaining in the developing device 4 when the toner cartridge 9 is exchanged is relatively small. Therefore, in this embodiment, the state of the toner remaining in the developing device 4 when the sequence enters the operation in the printing continuation mode is taken into consideration, and then the in-developing device target toner amount depending on the toner cartridge exchange number is set.

<Setting of In-Developing Device Target Toner Amount>

In this embodiment, the state of the toner remaining in the developing device 4 when the toner cartridge 9 is exchanged is predicted on the basis of an average print ratio in the image forming operation before the toner cartridge 9 is exchanged. This average print ratio can be predicted on the basis of the number of turns (rotations) of the developing roller 43 and the toner consumption amount (the toner supply amount and the remaining toner amount in the developing device 4 from the last exchange of the toner cartridge 9 to a current exchange of the toner cartridge 9.

Incidentally, instead of the number of turns of the developing roller 43, the surface movement distance (see embodiment 3) of the developing roller 43 and a rotation time (driving time) of the developing roller 43 may be used. Further, instead of the number of turns and the rotation time (driving time) of the developing roller 43, the number of sheets printed may be used. That is, when a value is an index value correlating with a use amount (driving amount) of the developing device 4 (developing roller 43), the value can be used. Further, the average print ratio may be directly calculated on the basis of the image data.

FIG. 12 schematically shows a function block of the controller 120 in this embodiment. The function block of the controller 120 in this embodiment is similar to the function block in the embodiment 1 shown in part (b) of FIG. 3. However, in this embodiment, the controller 120 is provided with a developing roller driving amount measuring portion 207 for measuring the number of turns of the developing roller 43. The developing roller driving amount measuring portion 207 measures the number of turns of the developing roller 43. For example, the developing roller driving amount measuring portion 207 is capable of measuring (calculating) the number of turns of the developing roller 43 on the basis of the driving time of the driving time of the developing roller 43 and a relationship, acquired in advance, between the driving time and the number of turns of the developing roller 43. The developing roller driving amount measuring portion 207 causes the process cartridge memory MP to store the measured number of turns of the developing roller 43. Further, in this embodiment, the controller 120 is provided with a toner state acquiring portion 208. In this embodiment, on the basis of the information stored in the process cartridge memory MP, the toner state acquiring portion 208 acquires the number of turns of the developing roller 43 and the toner consumption amount of the developing device 4 from the last exchange of the toner cartridge 9 to the current exchange of the toner cartridge 9. Then, the toner state acquiring portion 208 calculates the average print ratio on the basis of the number of turns of the developing roller 43 and the toner consumption amount of the developing device 4. That is, the number of turns of the developing roller 43 during the formation of the image on a single recording material P can be acquired in advance. Further, a relationship between the print ratio of the image formed on the single recording material P and the toner consumption amount of the developing device 4 can also be acquired in advance. Accordingly, the average print ratio can be acquired on the basis of the number of sheets printed, based on the number of turns of the developing roller 43, and the toner consumption amount of the developing device 4. The toner state acquiring portion 208 causes the process cartridge memory MP to store the calculated print ratio. In this embodiment, the developing roller driving amount measuring portion 207 and the toner state acquiring portion 208 are realized by execution of a program stored in the ROM 122, by the CPU 121.

A control sequence of the operation of the image forming apparatus 100 in this embodiment is similar to the sequence in the embodiment 1 shown in FIG. 4. However, in this embodiment, in S103 of FIG. 4, the controller 120 acquires the in-developing device target toner amount depending on the average print ratio at the time when the toner cartridge 9 is exchanged and the toner cartridge exchange number. The controller 120 causes the process cartridge memory MP to store the acquired in-developing device target toner amount.

In this embodiment, the in-developing device target toner amount was set as shown in a table 2 below. That is, in the case where the average print ratio is the same, the in-developing device target toner amount is made larger with an increasing exchange number of the toner cartridge 9. Further, in the case where the exchange number of the toner cartridge 9 is the same, the in-developing device target toner amount is made larger with a smaller average print ratio. The table 2 is an example of a setting of the in-developing device target toner amount in the case where the use environment of the image forming apparatus 100 is 23° C./50% RH. Incidentally, information indicating a relationship between the average print ratio, the toner cartridge exchange number, and the in-developing device target toner amount as shown in the table 2 is set in advance and stored as a table data or the like in the process cartridge memory MP (or the ROM 122). Further, in this embodiment, the usable toner amount of the toner which can be used by the developing device 4 in the operation in the printing continuation mode was uniformly set to 60 g. In the table 2, the toner amount (remaining toner amount) in the developing device 4 at the time of the end of the operation in the printing continuation mode is also shown in combination.

TABLE 2

| (23° C./50% RH) | | | | |
|---|---|---|---|---|
| PRINT RATIO (%) | 1ST TC (EN: 0) | 2ND TC (EN: 1) | 3RD TC (EN: 2) | 4TH TC (EN: 3) |
| <10 | 160 g (END: 100 g) | 180 g (END: 120 g) | 200 g (END: 140 g) | 220 g (END: 160 g) |
| 10 ≤ & < 20 | 160 g (END: 100 g) | 160 g (END: 100 g) | 190 g (END: 130 g) | 210 g (END: 150 g) |
| 20≤ | 160 g (END: 100 g) | 160 g (END: 100 g) | 160 g (END: 100 g) | 170 g (END: 110 g) |

Incidentally, setting of the in-developing device target toner amount in the table 2 is a setting in the case where a use environment of the image forming apparatus 100 is 23° C./50% RH, but the in-developing device target toner amount may be set depending on the use environment. For example, information of the in-developing device target toner amount as shown in table 2 can be set as a plurality of pieces of information depending on the use environment of the image forming apparatus 100. In this case, depending on the use environment of the image forming apparatus 100 when the in-developing device target toner amount is acquired, the in-developing device target toner amount may only be required from the information of the in-developing device target toner amount on an associated use environment. For example, in the case where the use environment of the image forming apparatus 100 is 15° C./10% RH, it is possible to use an in-developing device target toner amount setting made in advance in conformity to the use exchange number of 15° C./10% RH. This is also true for the embodiment 1.

Here, when the environment has a correlation with the in-developing device target toner amount (the state of the toner in the developing device 4), the environment may be at least one of a temperature and a humidity in a position at least inside and outside the image forming apparatus 100. Thus, in the case where the in-developing device target toner amount is set depending on the use environment of the image forming apparatus 100, the image forming apparatus 100 is provided with an environment sensor (for example, a temperature/humidity sensor) as an environment detecting means). Then, on the basis of environment information (for example, an absolute water content based on the temperature and the humidity) acquired by this environment sensor, the controller 120 may only be required to carry out control so as to use the in-developing device target toner amount set in advance depending on the information of the environment.

For example, the in-developing device target toner amount can be made larger in the case where the absolute water content is a predetermined value or more than in the case where the absolute water content is less than the predetermined value. This is based on the assumption of the case where advance of the toner deterioration degree becomes larger in a high temperature/high humidity environment than in a low temperature/low humidity environment. However, the present invention is not limited thereto. For example, depending on a device constitution, a toner characteristic, and the like, it is also possible to assume the case where the advance of the toner deterioration degree becomes larger in the low temperature/low humidity environment than in the high temperature/high humidity environment due to that the toner charge amount is increased and agglomeration and a lowering in flowability of the toner occur. In such a case, for example, it is possible to make the in-developing device target toner amount smaller in the case where the absolute water content is a predetermined value or more than in the case where the absolute water content is less than the predetermined value.

<Evaluation Experiment 2>

In order to evaluate an effect of this embodiment, an evaluation experiment 2 similar to the evaluation experiment 1 described in the embodiment 1 was conducted. However, in the image forming operation in the evaluation experiment 2, as the image data, horizontal lines with image print ratios ("PTR") of 5%, 15%, and 30% were used. In this embodiment (embodiment 2), the in-developing device target toner amount was set as shown in the table 2 depending on the average print ratio and the toner cartridge exchange number. Further, in the evaluation experiment 2, the use environment of the image forming apparatus 100 was 23° C./50% RH. Further, as a comparison example 2, a similar experiment was conducted for the case where the in-developing device target toner amount was set irrespective of the toner cartridge exchange number. In this comparison example 2, irrespective of the toner cartridge exchange number, and the average print ratio the in-developing device target toner amount was uniformly set to 160 g. Further, in each of this embodiment and the comparison example 2, the usable toner amount of the toner which can be used by the developing device 4 was set uniformly to 60 g.

A result of the evaluation experiment 2 is shown in a table 3 below. In the comparison example 2, a slightly occurred fog of 1% or more and less than 3% ("Δ") before exchange of the second toner cartridge (exchange number of 1) in the case where the print ratio was 5%, before exchange of the third toner cartridge (exchange number of 2) in the case where the print ratio was 15%, and before exchange of the fourth toner cartridge (exchange number of 3) in the case where the print ratio was 30%. Further, in the comparison example 2, in each of the cases of the print ratios, when the exchange number of the toner cartridge 9 was further increased, a fog of 3% or more occurred ("x"). On the other hand, in this embodiment, in either status of the second toner cartridge (exchange number of 1), the third toner cartridge (exchange number of 2), and the fourth toner cartridge (exchange number of 3), a fog of 1% or more did not occur ("○").

TABLE 3

(23° C./50% RH)

| | PTR | 1ST TC (EN: 0) | 2ND TC (EN: 1) | 3RD TC (EN: 2) | 4TH TC (EN: 3) |
|---|---|---|---|---|---|
| EMB. 2 | 5 | ○ | ○ | ○ | ○ |
| | 15 | ○ | ○ | ○ | ○ |
| | 30 | ○ | ○ | ○ | ○ |
| COMP. EX. 2 | 5 | ○ | Δ | X | X |
| | 15 | ○ | ○ | Δ | X |
| | 30 | ○ | ○ | ○ | Δ |

Thus, in this embodiment, the image forming apparatus 100 includes the print ratio acquiring portion (toner state acquiring portion) 208 for acquiring print ratio information on the average print ratio of the developer image formed by the developing device 4, and the setting portion (in-developing device target toner amount acquiring portion) 204 sets the start developer amount (corresponding to the in-developing device target toner amount in this embodiment) in the accommodating portion (developing container) 41 at the time of the start of the operation in the above-described operation mode (printing continuation mode) depending on the print ratio information and the exchange number information of the above-described supply container 9. In this embodiment, in the case where the print ratio indicated by the print ratio information is a first print ratio, the setting portion 204 sets, to a first value, the start developer amount in the case where the exchange number indicated by the exchange number information is a first exchange number, and sets, to a second value larger than the first value, the start developer amount in the case where the exchange number indicated by the exchange number information is a second exchange number larger than the first exchange number. In the case where the print ratio indicated by the print ratio information is a second print ratio larger than the first print ratio, the setting portion sets, to a third value smaller than the first value, the start developer amount in the case where the exchange number indicated by the exchange number information is the above-described first exchange number, and sets, to a fourth value larger than the above-described third value and smaller than the above-described second value, the start developer amount in the case where the exchange number indicated by the exchange number information is the above-described second exchange number.

As described above, in this embodiment, in consideration of the state of the toner remaining in the developing device 4 when the toner cartridge 9 is exchanged, the in-developing device target toner amount depending on the toner cartridge exchange number is set. By this, in this embodiment, in consideration of the state of the toner remaining in the developing device 4 when the toner cartridge 9 is exchanged, the toner amount of the toner in the developing device 4 depending on the toner cartridge exchange number at the time of the start of the operation in the printing continuation mode is set. Accordingly, according to this embodiment, depending on the state of the toner remaining in the developing device 4 when the toner cartridge 9 is exchanged, the occurrence of the image defect due to the deteriorated toner can be more appropriately suppressed until the end of the operation in the printing continuation mode.

Next, another embodiment (embodiment 2) of the present invention will be described. Basic constitution and operation of an image forming apparatus of this embodiment are the same as those of the image forming apparatus of the embodiment 1. Accordingly, in the image forming apparatus of this embodiment, elements having identical or corresponding functions or constitutions to those of the image forming apparatus of the embodiment 1 will be omitted from detailed description by adding the same reference numerals or symbols as those in the embodiment 1.

In the embodiment 2, a constitution in which the state of the toner remaining in the developing device 4 when the toner cartridge 9 is exchanged is taken into consideration, and then the in-developing device target toner amount depending on the toner cartridge exchange number is set, was described. In the embodiment 2, the average print ratio was acquired on the basis of the number of turns of the developing roller 43 and the toner amount of the toner consumed from the developing device 4, and then the in-developing device target toner amount was acquired from the relationship, set in advance, between the average print ratio, the toner cartridge exchange number, and the in-developing device target toner amount. On the other hand, in this embodiment, a toner deterioration degree of the toner remaining in the developing device 4 when the toner cartridge 9 is exchanged is acquired, and then the in-developing device target toner amount is acquired depending on the toner deterioration degree and the toner cartridge exchange number.

<Calculating Method of Toner Deterioration Degree>

A calculating method of the toner deterioration degree in this embodiment will be described.

In this embodiment, a toner deterioration degree W is "O" as an initial value, and is a value which is increased by being counted up with the rotation drive of the developing roller 43. Further, in this embodiment, the developing device 4 is detachably mountable, as the process cartridge 10, to the apparatus main assembly 110, and therefore, the toner deterioration degree W is stored in the process cartridge memory MP.

Further, in this embodiment, the toner deterioration degree W is obtained by converting an average deterioration degree of entirety of the toner in the developing device 4 into a numerical value. For that reason, when the toner amount in the developing device 4 is small, an advancing speed of the toner deterioration degree becomes high. On the other hand, when the new toner is supplied from the toner cartridge 9 into the developing device 4, the average deterioration degree of the entirety of the toner in the developing device 4 is restored. For that reason, the toner deterioration degree is counted down when the new toner is supplied from the toner cartridge 9 to the developing device 4. Typically, after the operation in the printing continuation mode is ended, the new toner is supplied from the new toner cartridge 9 (after the exchange) into the developing device 4, so that the toner deterioration degree is reset to the initial value (=0).

In this embodiment, a parameter showing the change in state of the toner as described above is actually measured or estimated, so that the toner deterioration degree W is calculated on the basis of a calculating method described below. In this embodiment, for simplification, the toner deterioration degree W is calculated every printing of images on two recording materials P. However, the toner deterioration degree W is not limited to the toner deterioration degree W calculated every printing of the images on the two recording materials P. For example, the toner deterioration degree W may be calculated every job of a predetermined number of times (for example, once), every printing of images on a predetermined number of sheets (recording materials P), every predetermined surface movement distance of the developing roller 43, or the like. Incidentally, a job is a series of operations for outputting image(s) on a single recording material P or a plurality of recording materials P by a single start instruction.

A formula used for calculating a toner deterioration degree Wn in this embodiment is as follows.

$$Wn = \left(W_{n-1} + \frac{Rn}{TM}\right) \times (TM - TC)/(TM - TC + TS) \qquad \text{formula (1)}$$

Further, parameters used in the formula (1) are as follows.

Wn: toner deterioration degree at the time of the end of the drive for n-th sheet (n is an integer of 1 or more)

Wn−1: toner deterioration degree at the time of the end of the drive for (n−1)-th sheet Rn: section surface movement distance of the developing roller driven for the n-th sheet TM: toner amount at the time of the start of the drive for the n-th sheet TC: toner amount of the toner consumed during the drive for the n-th sheet TS: toner amount of the toner supplied during the drive for the n-th sheet In this embodiment, in the case where it is assumed that the toner consumption amount and the toner supply amount as the same amount in order to carry out control for maintaining the toner amount in the developing device at a substantially constant value, TC=TS holds, so that the formula (1) becomes as follows.

$$Wn = \left(W_{n-1} + \frac{Rn}{TM}\right) \times \left(1 - \frac{TC}{TM}\right) \qquad \text{formula (2)}$$

According to the formula (2), in the case where the control for maintaining the toner amount at the substantially constant value is carried out, i.e., in the case where TC=TS holds, when the TC (TS) is large, a degree of an increase in toner deterioration degree becomes small. On the other hand, when the TC (TS) is small, the degree of the increase in toner deterioration degree becomes large. This represents that the advancing speed of the toner deterioration degree becomes large in the case where an image with a low print ratio is continuously outputted.

Further, in the case where the sequence enters the operation in the printing continuation mode, the toner amount TS of the toner supplied to the developing device 4 becomes 0, and therefore, the formula (1) becomes as follows.

$$Wn = W_{n-1} + \frac{Rn}{TM} \qquad \text{formula (3)}$$

The formula (3) represents that in the operation in the printing continuation mode, the TM ("toner amount at the time of the start of the drive for the n-th sheet") is an important parameter for the toner deterioration degree. That is, the formula (3) represents that in the operation in the printing continuation mode, the advancing speed of the toner deterioration degree becomes higher than the advancing speed in a state in which the toner deterioration degree is calculated by the formula (2).

A function block of the controller 120 in this embodiment is similar to the function block in the embodiment 2 shown in FIG. 12. However, in this embodiment, the developing roller driving amount measuring portion 207 measures the section surface movement distance Rn of the developing roller 43 every predetermined timing (every printing of images on the two recording materials P in this embodiment). The developing roller driving amount measuring portion 207 causes the process cartridge memory MP to store the measured section surface movement distance Rn of the developing roller 43. For example, the developing roller driving amount measuring portion 207 can measure (calculate) the surface movement distance R of the developing roller 43 by a formula: R=Td×Ps×Sr, in which Td represents a driving time of the developing device 4, Ps represents a process speed of the image forming apparatus 100, and Sr represents a peripheral speed ratio of the developing roller 43 to the photosensitive drum 1. Here, the surface movement distance of the developing roller 43 is a distance indicating low long a point on the surface of the developing roller 43 travels (moves) by rotation of the developing roller 43. Incidentally, information on the surface movement distance of the developing roller 43 is not limited to the surface movement distance (traveling distance) itself, but may also be the number of turns, a rotation time (driving time), and the like. When a value thereof is an index value correlating with the use amount (driving amount) of the developing device 4 (developing roller 43), the value can be used. Further, the process speed of the image forming apparatus 100 is a rotational speed (peripheral speed) of the photosensitive drum 1. Further, in this embodiment, the developing device use history acquiring portion 201 causes the process cartridge memory MP to store the above-described TM, TC, and TS every predetermined timing (every printing of the images on the two sheets in this embodiment). Further, in this embodiment, the toner state acquiring portion 208 calculates the toner deterioration degree by the above-described formula every predetermined timing (every printing of the images on the two sheets in this embodiment). The toner state acquiring portion 208 causes the process cartridge memory MP to store the calculated toner deterioration degree Wn.

<Sequence for Calculating Toner Deterioration Degree>

Next, a calculating procedure of the toner deterioration degree in this embodiment will be described. FIG. 13 is a flowchart for illustrating a sequence of control for calculating the toner deterioration degree in this embodiment. In this embodiment, the controller 120 calculates the toner deterioration degree by performing respective processes of the sequence shown in FIG. 13. Incidentally, for simplification, description is made in some cases on the assumption that a main body performing the processes by the above-described function blocks in the controller 120 is the controller 120. Further, for simplification, FIG. 13 shows the case of printing of images on two sheets in one job.

S201: The controller 120 communicates with the process cartridge memory MP and reads the toner amount TM in the developing device 4 as information stored at the time of the last stop of the image forming apparatus 100. Further, the controller 120 communicates with the process cartridge memory MP and reads a toner deterioration degree Wn−2.

S202: The controller 120 starts an image formation preparation operation.

S203: The controller 120 causes the developing roller 43 to start a rotational drive operation and starts counting of the section surface movement distance Rn of the developing roller 43.

S204: The controller 120 executes the printing of the images on the two sheets (recording materials).

S205: The controller 120 executes an image formation end operation.

S206: The controller 120 not only ends the rotational drive operation, but also stops the counting of the section surface movement distance Rn of the developing roller 43.

S207: The controller 120 calculates the toner consumption amount TC during the rotational drive operation of the developing roller 43. The controller 120 calculates the toner consumption amount TC by adding a toner amount of the toner used during image formation and a toner amount of the toner used during non-image formation together.

S208: The controller 120 calculates the section toner supply amount TS of the toner from the toner cartridge 9 to the developing device 4.

S209: The controller 120 calculates the toner deterioration degree Wn on the basis of the formula (1) with use of TM, Wn−2, Rn, Tc, and Ts.

S210: The controller 120 calculates a current toner amount in the developing device 4 by the following formula: TM—TC+TS. Then, the controller 120 communicates with the process cartridge memory MP and causes the process cartridge memory MP to store (update) the calculated toner amount TM in the developing device 4 and the calculated toner deterioration degree W.

<Control Sequence of Operation of Image Forming Apparatus>

A control sequence of the operation of the image forming apparatus will be described. The control sequence of the operation of the image forming apparatus is similar to the control sequence in the embodiment 1 shown in FIG. 4. However, in this embodiment, the in-developing device target toner amount is acquired on the basis of the toner cartridge exchange number and the toner deterioration degree.

That is, in this embodiment, the controller 120 executes the sequence shown in FIG. 4 described in the embodiment 1, while the controller 120 executes the sequence for calculating the toner deterioration degree shown in FIG. 13. By this, the toner cartridge exchange number and the toner deterioration degree can be acquired. Further, in S103 of FIG. 4, the controller 120 acquires the in-developing device target toner amount depending on the toner cartridge exchange number and the toner deterioration degree.

Evaluation Experiment 3

(Method)

Next, an evaluation experiment 3 in which an effect of this embodiment was evaluated will be described. In the evaluation experiment 3, an image forming operation in which images were formed on 200000 sheets of recording materials P was performed. In this image forming operation, as image data, horizontal lines with image print ratios set so as to provide toner deterioration degrees of 80, 40, and 20 when the toner cartridge 9 is exchanged were used, respectively. The image forming operation was continued while successively supplying, from the toner cartridge 9 to the developing device 4, the toner in an amount corresponding to an amount of consumption from the developing device 4. Further, in the evaluation experiment 3, in order to forcedly reproduce a state in which the toner cannot be supplied from the toner cartridge 9 to the developing device 4, the sequence always entered the operation in the printing continuation mode. Thereafter, in the case where the end of the operation in the printing continuation mode is notified, the exchange of the toner cartridge 9 was made.

In this embodiment, the in-developing device target toner amount was set as shown in a table 4 below depending on the toner deterioration degree and the toner cartridge exchange number. That is, in the case where the toner deterioration degree is the same, the in-developing device target toner amount is made larger with an increasing exchange number of the toner cartridge 9. Further, in the case where the evaluation of the toner cartridge 9 is the same, the in-developing device target toner amount is made larger with a larger toner deterioration degree. Further, in the evaluation experiment 3, the toner cartridge exchange number was counted as an integer value. Further, in the evaluation experiment 3, a use environment of the image forming apparatus 100 was 23° C./50% RH. Incidentally, information indicating a relationship, as shown in table 4, between the toner deterioration degree, the toner cartridge exchange number, and the in-developing device target toner amount is set in advance and stored as table data or the like in the process cartridge memory MP (or the ROM 122). The setting of the in-developing device target toner amount in the table 4 is a setting in the case where the use environment of the image forming apparatus 100 is 23° C./50% RH, but similarly as described in the embodiment 2, the in-developing device target toner amount may be set depending on the use environment of the image forming apparatus 100. Further, in this embodiment, the usable toner amount of the toner which can be used in the developing device 4 in the operation in the printing continuation mode was set uniformly to 60 g.

Further, as a comparison example 3, a similar experiment was conducted for the case where the in-developing device target toner amount was set irrespective of the toner cartridge exchange number. In the comparison example 3, irrespective of the toner cartridge exchange number and the toner deterioration degree, the in-developing device target toner amount was set uniformly to 160 g. Further, also in the comparison example 3, similarly as in this embodiment, the usable toner amount of the toner which can be used by the developing device 4 in the operation in the printing continuation mode was set uniformly to 60 g.

TABLE 4

(23° C./50% RH)

| TDD | 1ST TC (EN: 0) | 2ND TC (EN: 1) | 3RD TC (EN: 2) | 4TH TC (EN: 3) |
|---|---|---|---|---|
| 50≤ | 160 g (END: 100 g) | 180 g (END: 120 g) | 200 g (END: 140 g) | 220 g (END: 160 g) |
| 30 ≤ & < 50 | 160 g (END: 100 g) | 160 g (END: 100 g | 190 g (END: 130 g) | 210 g (END: 150 g) |
| <30 | 160 g (END: 100 g) | 160 g (END: 100 g) | 160 g (END: 100 g) | 170 g (END: 110 g) |

(Result)

A result of the evaluation experiment 3 is shown in a table 5 below. In the comparison example 3, the slight fog of 1% or more and less than 3% occurred ("Δ") before exchange of the second toner cartridge (exchange number of 1) in the case where the toner deterioration degree ("TDD") was 80, before exchange of the third toner cartridge (exchange number of 2) in the case where the toner deterioration degree was 40, and before exchange of the fourth toner cartridge (exchange number of 3) in the case where the toner deterioration degree was 20. Further, in the comparison example 3, in each of the cases of the print ratios, when the exchange number of the toner cartridge 9 was further increased, the fog of 3% or more occurred ("x"). On the other hand, in this embodiment, in either status of the second toner cartridge (exchange number of 1), the third toner cartridge (exchange number of 2), and the fourth toner cartridge (exchange number of 3), the fog of 1% or more did not occur ("○").

TABLE 5

(23° C./50% RH)

| | TDD | 1ST TC (EN: 0) | 2ND TC (EN: 1) | 3RD TC (EN: 2) | 4TH TC (EN: 3) |
|---|---|---|---|---|---|
| EMB. 3 | 80 | ○ | ○ | ○ | ○ |
| | 40 | ○ | ○ | ○ | ○ |
| | 20 | ○ | ○ | ○ | ○ |
| COMP. | 80 | ○ | Δ | X | X |
| EX. 3 | 40 | ○ | ○ | Δ | X |
| | 20 | ○ | ○ | ○ | Δ |

Thus, in this embodiment, the image forming apparatus 100 includes a developing information acquiring depending on (developing roller driving amount measuring portion) 207 for acquiring developing information (surface movement distance of the developing roller 43) on the surface movement distance of a rotatable developing member (developing roller 43) and a deterioration degree acquiring portion (toner state acquiring portion) 208 for updating and acquiring deterioration degree information on the deterioration degree of the developer in the accommodating portion 41 based on the developing information and the second developer amount information of the developer in the accommodating portion (developing container) 41 every predetermined timing, and the setting portion (in-developing device target toner amount acquiring portion) 204 sets the start developer amount (corresponding to the in-developing device target toner amount in this embodiment) in the above-described accommodating portion (developing container) 41 at the timing of a start of the operation in the above-described operation mode (printing continuation mode) depending on the toner deterioration degree information and the exchange number information of the toner cartridge 9. In this embodiment, in the case where the toner deterioration degree indicated by the toner deterioration degree information is a first toner deterioration degree, the setting portion 204 sets, to a first value, the start developer amount in the case where the exchange number indicated by the exchange number information is a first exchange number, and sets, to a second value larger than the first value, the start developer amount in the case where the exchange number indicated by the exchange number information is a second exchange number larger than the first exchange number. In the case where the toner deterioration degree indicated by the toner deterioration degree information is a second toner deterioration degree at which the deterioration degree of the developer in the accommodating portion is lower than the first toner deterioration degree, the setting portion sets, to a third value smaller than the first value, the start developer amount in the case where the exchange number indicated by the exchange number information is the above-described first exchange number, and sets, to a fourth value larger than the above-described third value and smaller than the above-described second value, the start developer amount in the case where the exchange number indicated by the exchange number information is the above-described second exchange number.

As described above, according to this embodiment, the in-developing device target toner amount depending on the toner cartridge exchange number can be set in more appropriate consideration of the state of the toner remaining in the developing device 4 when the toner cartridge 9 is exchanged. By this, according to this embodiment, the in-developing device target toner amount depending on the toner cartridge exchange number can be more appropriately set.

In the above, the present invention was described based on specific embodiments, but is not limited to the above-described embodiments.

In the above-described embodiments, the end of the operation in the printing continuation mode is notified to the operator, but advance notification may be made before the toner consumption amount reaches the usable toner amount. For example, in the case where a threshold smaller than the usable toner amount is set and the toner consumption amount in the operation in the printing continuation mode reaches or exceeds the threshold, advance notification of the end of the operation in the printing continuation mode (notification that an end timing of the operation in the printing continuation mode is close) may be made. In addition, the same also applies to the notification of the toner out of the process, so that advance notification of the toner out may also be made.

Further, by the control of the controller, information on a remaining amount of the toner usable in the operation of the printing continuation mode may be displayed on the operation panel automatically at a predetermined timing (for example, every increase in toner consumption amount in the operation in the printing continuation mode by a predetermined amount). Further, at an arbitrary timing depending on the operation in the operation panel by the operator, the information on the remaining amount of the toner usable in the operation in the printing continuation mode may be displayed on the operation panel.

The information on the remaining amount of the toner usable in the operation in the printing continuation mode may be, in addition to the information on the toner amount, a remaining toner amount (%) on the usable toner amount, the number of sheets printable calculated on the basis of a predetermined print ratio (normal print ratio, average print ratio past, or the like), and the like. This is also true for the toner out of the toner cartridge, and a remaining amount of the toner usable until the toner out may be displayed at a predetermined timing or an arbitrary timing.

Further, notification of information to the operator is not limited to notification by display of a message or the like on the display portion. For example, the notification may also be a warning sound or voice vocalization in a pronunciation (phonation) portion, or lighting or flickering of light, or the like.

Further, display or input performed in the operation panel in the above-described explanation may also be performed in the external device communicatably connected to the image forming apparatus.

Further, the image forming apparatus to which the present invention is applicable is not limited to the image forming apparatuses having basic constitutions shown in the above-described embodiments. For example, the present invention is also applicable to a color laser printer which includes a plurality of process cartridges detachably mountable thereto and in which a full-color image and the like are formed by transferring toner images of a plurality of colors onto a recording material with use of an intermediary transfer member such as an intermediary transfer belt. Further, in the above-described embodiments, the image forming apparatus has a constitution to which the process cartridge is detachably mountable, but the present invention is also applicable to an image forming apparatus in which a process unit similar to members constituting the process cartridge in the above-described embodiments is provided in an apparatus main assembly.

Further, the recording material used in the image forming apparatus includes various sheet-like members different in material, inclusive of paper such as plain paper or thick paper, a plastic film such as a sheet for an overhead projector, a special-shaped sheet such as an envelope or index paper, and a cloth.

Further, in the above-described embodiments, the developing device employs the contact development type in which the image bearing member and a developer carrying member are disposed in contact with each other, but the present invention is not limited thereto. The developing device may also employ a two-component development type using a two-component developer or a non-contact development type in which the image bearing member and the developer carrying member are disposed opposed to each other with a predetermined gap.

According to the present invention, it is possible to suppress the occurrence of the image defect due to the deteriorated toner until the end of the operation in the operation mode capable of continuing the image forming operation in a state in which the developer cannot be sufficiently supplied from the supply container to the developing device.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-207683 filed on Dec. 23, 2022, which is hereby incorporated by reference herein in its entirety.

What is claimed is:

1. An image forming apparatus comprising:

an image bearing member configured to bear a developer image;

a developing unit which includes a developing member for forming the developer image on the image bearing member by supplying a developer to the image bearing member and an accommodating portion for accommodating the developer supplied to the developing member and to which a supply container accommodating the developer supplied to the accommodating portion is detachably mountable;

a first developer amount acquiring portion configured to acquire first developer amount information on a developer amount of the developer in the supply container connected to the developing unit;

a second developer amount acquiring portion configured to acquire second developer amount information on a developer amount of the developer in the accommodating portion;

a storing portion configured to store exchange number information on a number of times of the exchange of the supply container for the developing unit;

a developing setting portion configured to set a start developer amount which is a developer amount of the developer in the accommodating portion at a time of a start of an operation in an operation mode in which a developer image is formed by the developing unit;

a print ratio acquiring portion configured to acquire print ratio information on an average print ratio of the developer image formed by the developing unit; and a controller, wherein the controller controls i) to notify first notification on an exchange of the supply container in a case in which the developer in the supply container is decreased in amount by being supplied from the supply container to the accommodating portion and then the developer amount of the developer in the supply container indicated by the first developer amount information reaches a predetermined developer amount, ii) to execute the operation in the operation mode until the supply container connected to the developing unit is exchanged after the first notification, and iii) to notify second notification of an end of the operation in the operation mode in a case in which a use amount of the developer from the developing unit indicated by the second developer amount information reaches a predetermined usable amount, wherein the developing setting portion sets the start developer amount depending on the exchange number information and the print ratio information and does not change the predetermined usable amount.

2. The image forming apparatus according to claim 1, wherein the developing setting portion sets the start developer amount in a case that the exchange number indicated by the exchange number information is a first exchange number, to a first value, and sets the start developer amount in a case that the exchange number indicated by the exchange number information is a second exchange number larger than the first exchange number, to a second value larger than the first value.

3. The image forming apparatus according to claim 1, wherein a case that the print ratio indicated by the print ratio information is a first print ratio, the developing setting portion sets the start developer amount in a case that the exchange number indicated by the exchange number information is a first exchange number, to a first value, and sets the start developer amount in a case that the exchange number indicated by the exchange number information is a second exchange number larger than the first exchange number, to a second value larger than the first value, and wherein in a case that the print ratio indicated by the print ratio information is a second print ratio larger than the first print ratio, the developing setting portion sets the start developer amount in a case that the exchange number indicated by the exchange number information is the first exchange number, to a third value smaller than the first value, and sets the start developer amount in a case that the exchange number indicated by the exchange number information is the second exchange number, to a fourth usable amount larger than the third value and smaller than the second value.

4. The image forming apparatus according to claim 1, further comprising:

a development information acquiring portion configured to acquire development information on a surface movement distance of the developing member which is rotatable; and a deterioration degree acquiring portion configured to acquire deterioration degree information on a deterioration degree of the developer in the accommodating portion based on the development information and the second developer amount information in an update manner for each predetermined timing, wherein the developing setting portion sets the start developer amount depending on the deterioration degree information and the exchange number information.

5. The image forming apparatus according to claim 4, wherein in a case that the deterioration degree indicated by the deterioration degree information is a first deterioration degree, the developing setting portion sets the start developer amount in a case that the exchange number indicated by the exchange number information is a first exchange number, to a first value, and sets the start developer amount in a case that the exchange number indicated by the exchange number information is a second exchange number larger than the first exchange number, to a second value larger than the first value, and wherein in a case that the deterioration degree indicated by the deterioration degree information is a second deterioration degree indicating that the deterioration degree of the developer in the accommodating portion is lower than the first deterioration degree, the developing setting portion sets the start developer amount in a case that the exchange number indicated by the exchange number information is the first exchange number, to a third value smaller than the first value, and sets the start developer amount in a case that the exchange number indicated by the exchange number information is the second exchange number to a fourth value larger than the third value and smaller than the second value.

6. The image forming apparatus according to claim 1, wherein the developing setting portion changes a setting of the start developer amount by changing a setting of a target developer amount which is a target value of the developer amount of the developer in the accommodating portion in a supplying operation of the developer from the supply container to the accommodating portion.

7. The image forming apparatus according to claim 1, further comprising:

a discharging unit configured to discharge the developer from the supply container toward the accommodating portion, wherein the controller controls the discharging unit so that before the developer amount of the developer in the supply container indicated by the first developer amount information reaches the predetermined developer amount, the developer amount of the developer in the accommodating portion indicated by the second developer amount information is maintained within a predetermined range relative to a target developer amount by successively supplying the developer from the supply container to the accommodating portion with use of the developer from the developing unit.

8. The image forming apparatus according to claim 7, wherein the predetermined developer amount is an amount in which the developer is incapable of being supplied from the supply container to the accommodating portion.

9. The image forming apparatus according to claim 7, wherein the predetermined developer amount is an amount in which a discharge amount of the developer from the supply container by a predetermined operation of the discharging unit is smaller than a predetermined discharge amount.

10. The image forming apparatus according to claim 1, wherein the predetermined usable amount is set irrespective of the exchange number.

11. The image forming apparatus according to claim 1, wherein the developing unit is detachably mountable to an apparatus main assembly of the image forming apparatus.

12. The image forming apparatus according to claim 11, wherein the storing portion is detachably mountable together with the developing unit to the apparatus main assembly.

* * * * *